US011425450B2

United States Patent
Hamada et al.

(10) Patent No.: US 11,425,450 B2
(45) Date of Patent: *Aug. 23, 2022

(54) INFORMATION PROCESSING METHOD, AND DISPLAY APPARATUS

(71) Applicant: MAXELL, LTD., Kyoto (JP)

(72) Inventors: Koichi Hamada, Tokyo (JP); Nobuaki Kabuto, Tokyo (JP); Junji Shiokawa, Tokyo (JP); Takashi Matsubara, Tokyo (JP)

(73) Assignee: MAXELL, LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/135,059

(22) Filed: Dec. 28, 2020

(65) Prior Publication Data

US 2021/0120303 A1 Apr. 22, 2021

Related U.S. Application Data

(63) Continuation of application No. 16/530,522, filed on Aug. 2, 2019, now Pat. No. 10,911,820, which is a (Continued)

(51) Int. Cl.
*H04N 21/254* (2011.01)
*H04N 21/258* (2011.01)
(Continued)

(52) U.S. Cl.
CPC ....... *H04N 21/436* (2013.01); *H04N 21/2541* (2013.01); *H04N 21/25875* (2013.01);
(Continued)

(58) Field of Classification Search
CPC .............. H04N 21/436; H04N 21/2541; H04N 21/6582; H04N 21/835; H04N 21/25875; H04N 21/41407; H04N 21/4532
See application file for complete search history.

(56) References Cited

U.S. PATENT DOCUMENTS 10,425,682 B2    9/2019   Hamada et al.
10,911,820 B2 *  2/2021   Hamada ........... H04N 21/41407
(Continued)

FOREIGN PATENT DOCUMENTS

CN    103414740 A    11/2013
CN    103533392 A    1/2014
(Continued)

OTHER PUBLICATIONS

International Search Report issued in corresponding International Application No. PCTIJP2015/082106, dated Jan. 19, 2016, with English Translation.
(Continued)

*Primary Examiner* — Hsiungfei Peng
(74) *Attorney, Agent, or Firm* — McDermott Will & Emery LLP

(57) ABSTRACT

An information processing method in a content viewing system that includes: a first display apparatus and a second display apparatus configured to communicate with each other via a home network, receive and reproduce contents of a content distribution service from a server on a network; and a mobile terminal configured to communicate with each of the display apparatus, includes: a first step of obtaining account information, which the mobile terminal has, from the mobile terminal by the first display apparatus, the account information being associated with the content distribution service; a second step of transferring the account information to the second display apparatus by the first display apparatus; and a third step of receiving the contents from the server by using the account information by the second display apparatus to reproduce the contents.

1 Claim, 16 Drawing Sheets

Related U.S. Application Data continuation of application No. 15/776,337, filed as application No. PCT/JP2015/082106 on Nov. 16, 2015, now Pat. No. 10,425,682.

(51) Int. Cl.
  *H04N 21/414* (2011.01)
  *H04N 21/436* (2011.01)
  *H04N 21/45* (2011.01)
  *H04N 21/658* (2011.01)
  *H04N 21/835* (2011.01)

(52) U.S. Cl.
  CPC ... *H04N 21/41407* (2013.01); *H04N 21/4532* (2013.01); *H04N 21/6582* (2013.01); *H04N 21/835* (2013.01)

(56) References Cited

U.S. PATENT DOCUMENTS

| | | |
|---|---|---|
| 2004/0249815 A1 | 12/2004 | Lee |
| 2009/0144811 A1 | 6/2009 | Matsubara et al. |
| 2010/0211884 A1 | 8/2010 | Kashyap et al. |
| 2011/0030000 A1 | 2/2011 | Tojima |
| 2014/0024341 A1 | 1/2014 | Johan |
| 2016/0044367 A1 | 2/2016 | Matsubara et al. |
| 2016/0100199 A1 | 4/2016 | DuBose |
| 2016/0105826 A1 | 4/2016 | Matsunaga |
| 2016/0182934 A1 | 6/2016 | Nichols et al. |
| 2017/0019394 A1 | 1/2017 | Yastrebenetsky et al. |

FOREIGN PATENT DOCUMENTS

| | | |
|---|---|---|
| JP | 2004-362546 A | 12/2004 |
| JP | 2005-227857 A | 8/2005 |
| JP | 2007-143059 A | 6/2007 |
| JP | 2007-334529 A | 12/2007 |
| JP | 2008-271357 A | 11/2008 |
| JP | 2009-135775 A | 6/2009 |
| JP | 2012-004916 A | 1/2012 |
| JP | 5248180 B2 | 7/2013 |
| WO | 03/081499 A1 | 10/2003 |
| WO | 2015/087508 A1 | 6/2015 |

OTHER PUBLICATIONS

U.S. PTO Non-Final Office Action issued in related parent U.S. Appl. No. 16/530,522, dated Jun. 9, 2020.
U.S. PTO Notice of Allowance issued in related parent U.S. Appl. No. 16/530,522, dated Oct. 5, 2020.
Parent U.S. Appl. No. 16/530,522, filed Aug. 2, 2019.
Chinese Office Action issued in corresponding Chinese Patent Application No. 201580084574.4, dated Jan. 2, 2020, with English translation.
Chinese Office Action issued in corresponding Chinese Patent Application No. 201580084574.4, dated Jul. 29, 2020, with English translation.
U.S. PTO Non-Final Office Action issued in parent U.S. Appl. No. 15/776,337, dated Nov. 16, 2018.
U.S. PTO Notice of Allowance issued in parent U.S. Appl. No. 15/776,337, dated May 21, 2019.
Parent U.S. Appl. No. 15/776,337, filed May 15, 2018.

* cited by examiner

FIRST PROCESSING AS FIRST APPARATUS

SECOND PROCESSING AS SECOND APPARATUS

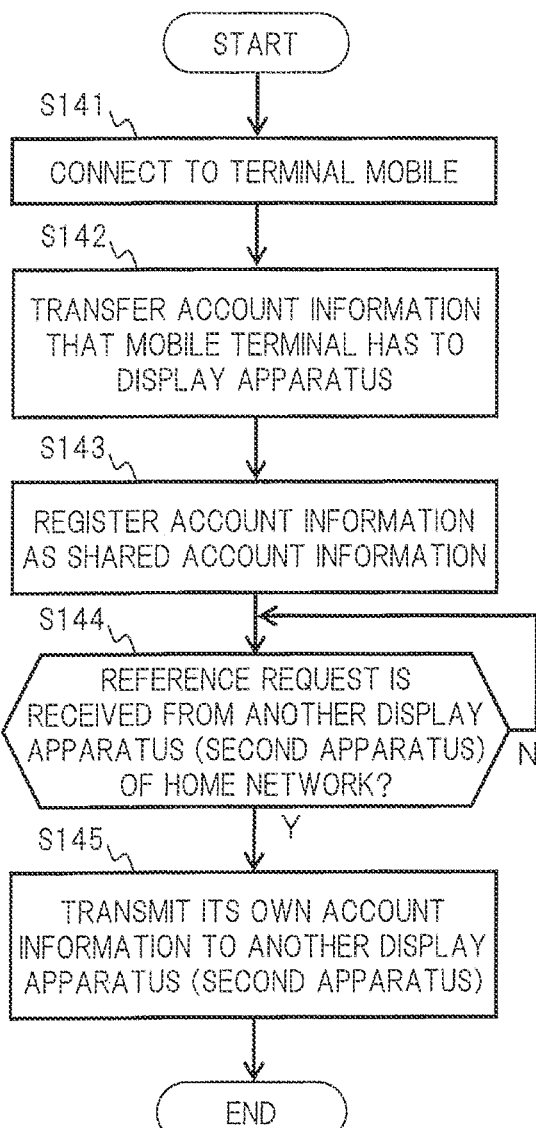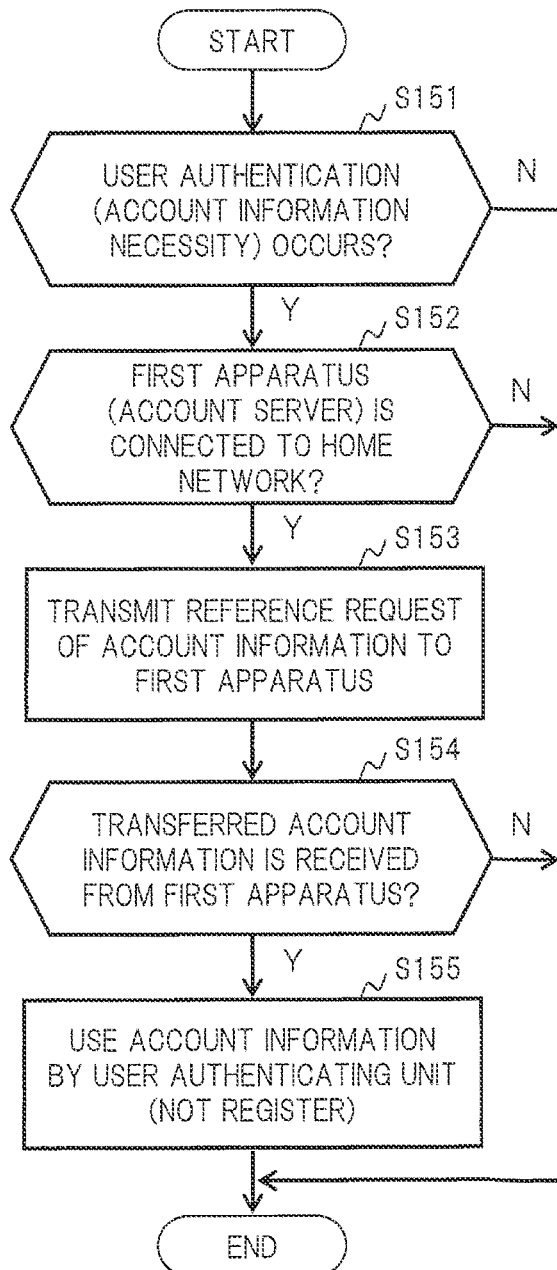

FIG. 15

SETTING SCREEN g1 — ACCOUNT SHARING FUNCTION IS USED? :  ⊙USE  ○NOT USE g2 — INDIVIDUAL SETTING FOR EACH APPARATUS IS CARRIED OUT? :  ⊙CARRY OUT  ○NOT CARRY OUT g3 — SHARING IS ALSO CARRIED OUT WITH RESPECT TO GUEST? :  ⊙CARRY OUT  ○NOT CARRY OUT g4 — INDIVIDUAL SETTING FOR EACH APPARATUS:

| APPARATUS NAME | APPARATUS ID | ACCOUNT SHARING PROPRIETY | CONTENT PROPRIETY |
|---|---|---|---|
| TV1 | MAC ADDRESS 1 | ☑ * AVAILABLE | ALL |
| TV2 | MAC ADDRESS 2 | ☑ | C00003 |
| ...... | ...... | ...... | ...... |
| TVn | MAC ADDRESS n | ☐ * UNAVAILABLE | ALL | g5 — PROPRIETY SETTING FOR EACH APPARATUS:  ACCOUNT INFORMATION: A001 (SERVICE X1)

| CONTENT ID | ...... | VIEWING PROPRIETY |
|---|---|---|
| C00001 | ...... | ☑ * AVAILABLE |
| C00002 | ...... | ☑ |
| C00003 | ...... | ☐ * UNAVAILABLE |
| ...... | ...... | ...... |

[ SET ]   [ CANCEL ]

FIG. 16

SETTING INFORMATION

| ACCOUNT INFORMATION | MOBILE TERMINAL APPARATUS ID | DISPLAY APPARATUS APPARATUS ID | SHARING PROPRIETY | CONTENT PROPRIETY |
|---|---|---|---|---|
| A001 | ID001 | MAC ADDRESS1 | AVAILABLE (1) | ALL |
| A001 | ID001 | MAC ADDRESS2 | AVAILABLE (1) | ALL |
| A001 | ID001 | MAC ADDRESS3 | AVAILABLE (1) | ALL |
| A002 | ID002 | MAC ADDRESS1 | AVAILABLE (1) | ALL |
| A002 | ID002 | MAC ADDRESS2 | UNAVAILABLE (0) | ALL |
| A002 | ID002 | MAC ADDRESS3 | UNAVAILABLE (0) | ALL |
| ... | ... | ... | ... | ... |
| B001 | ID001 | MAC ADDRESS1 | AVAILABLE (1) | C00003 |
| ... | ... | ... | ... | ... |

INFORMATION PROCESSING METHOD, AND DISPLAY APPARATUS

RELATED APPLICATIONS

This application is a Continuation of U.S. patent application Ser. No. 16/530,522 filed on Aug. 2, 2019, which is a Continuation of U.S. patent application Ser. No. 15/776,337 filed on May 15, 2018, now U.S. Pat. No. 10,425,682 issued on Sep. 24, 2019, which is an U.S. National Phase under 35 U.S.C. § 371 of International Application No. PCT/JP2015/082106, filed on Nov. 16, 2015, the disclosure of which is incorporated by reference herein.

TECHNICAL FIELD

The present invention relates to information processing and display technique related to viewing of contents in a content distribution service.

BACKGROUND ART

There are various kinds of content distribution services for distributing contents such as videos on a communication network. In the content distribution service, it is required to control authorities, permission and the like with respect to usage of the service and viewing of contents by a user. In other words, such controls are required with respect to reception and reproduction of the contents by apparatus of the user. Conventionally, for the controls, account information associated with a user who uses the content distribution service has been used. A content distribution server carries out authentication by using the account information. In a case where a result of the authentication is success, the user is permitted to receive and reproduce the contents via the apparatus of the user.

On the other hand, in recent years, the case where plural kinds of apparatuses including a TV receiver (hereinafter, referred to also as a "display apparatus" or the like) are connected to a home network of a user and a home system is thereby constructed is increased.

As an example of prior art regarding restriction to view contents, Japanese Patent No. 5,248,180 (Patent Document 1) is cited. In Patent Document 1, as an "operation target apparatus", it is described that "a permitter who has authority grants permission for an operator for whom execution of a predetermined operation is restricted by a simple operation, whereby the operator is allowed to carry out the restricted operation".

RELATED ART DOCUMENTS

Patent Documents

Patent document 1: Japanese Patent No. 5,248,180B

SUMMARY OF THE INVENTION

Problems to be Solved by the Invention

According to the prior art like Patent Document 1, it is possible to restrict viewing of contents. However, the prior art fails to consider various usage environments and usage situations such as a home network of the user. For that reason, in a case of dealing with it, usability for the user is not sufficient, and there is a problem in view of convenience.

The user utilizes a content distribution service by using apparatus such as a TV receiver, which is connected to a home network, as a content reproducing apparatus, and can view contents. In order to allow the user to view the contents via the apparatus, it is necessary to carry out a work to set account information of the content distribution service to the apparatus. For example, the user sets the account information that is associated with his or her mobile terminal and this mobile terminal has to the apparatus of the home network.

However, in a case where a plurality of apparatuses is connected to the home network, it is necessary to carry out a work to set account information to each apparatus. Therefore, labor of the user becomes large. Further, in a case where plural pieces of account information to be registered exist and the like, the labor of the user becomes further larger.

It is an object of the present invention to provide, with respect to techniques including a display apparatus for viewing contents, a technique by which it is possible to reduce labor for a user to set account information to his or her apparatus while securing control of authority to view contents by using the account information, and this makes it possible to user-friendly improve convenience in various environments and situations.

Means for Solving the Problem

A representative embodiment of the present invention is an information processing method and a display apparatus that are characterized by having a configuration shown below.

An information processing method according to one embodiment is an information processing method for a content viewing system, the content viewing system including: a first display apparatus and a second display apparatus configured to communicate with each other via a home network, each of the first display apparatus and the second display apparatus being configured to receive contents of a content distribution service from a server on a network and reproduce the contents; and a mobile terminal configured to communicate with each of the first display apparatus and the second display apparatus, the information processing method comprising: a first step of obtaining account information, which the mobile terminal has, from the mobile terminal by the first display apparatus, the account information being associated with the content distribution service; a second step of transferring the account information obtained at the first step to the second display apparatus connected to the home network by the first display apparatus; and a third step of receiving the contents from the server by the second display apparatus by using the account information transferred at the second step to reproduce the contents.

A display apparatus according to one embodiment is a display apparatus in a content viewing system, the content viewing system including: the display apparatus configured to communicate with others via a home network, the display apparatus being configured to receive contents of a content distribution service from a server on a network and reproduce the contents; and a mobile terminal configured to communicate with the display apparatus, wherein the display apparatus is configured to communicate with the mobile terminal to obtain account information, which the mobile terminal has, from the mobile terminal, the account information being associated with the content distribution service, wherein the obtained account information is transferred to other display apparatus that is connected to the home network, and wherein the contents are received from the server by using the transferred account information to be reproduced when the contents are transferred.

Effects of the Invention

According to a representative embodiment of the present invention, with respect to techniques including a display apparatus for viewing contents, it is possible to reduce labor for a user to set account information to his or her apparatus while securing control of authority to view contents by using the account information, and this makes it possible to user-friendly improve convenience in various environments and situations.

BRIEF DESCRIPTIONS OF THE DRAWINGS

FIGS. 9A and 9B are views showing a processing flow of the display apparatus according to the second embodiment;

FIG. 15 is a view showing an example of a setting screen according to the fourth embodiment; and FIG. 16 is a view showing a table example of setting information according to the fourth embodiment.

DETAILED DESCRIPTION OF PREFERRED EMBODIMENTS

Figure 1:
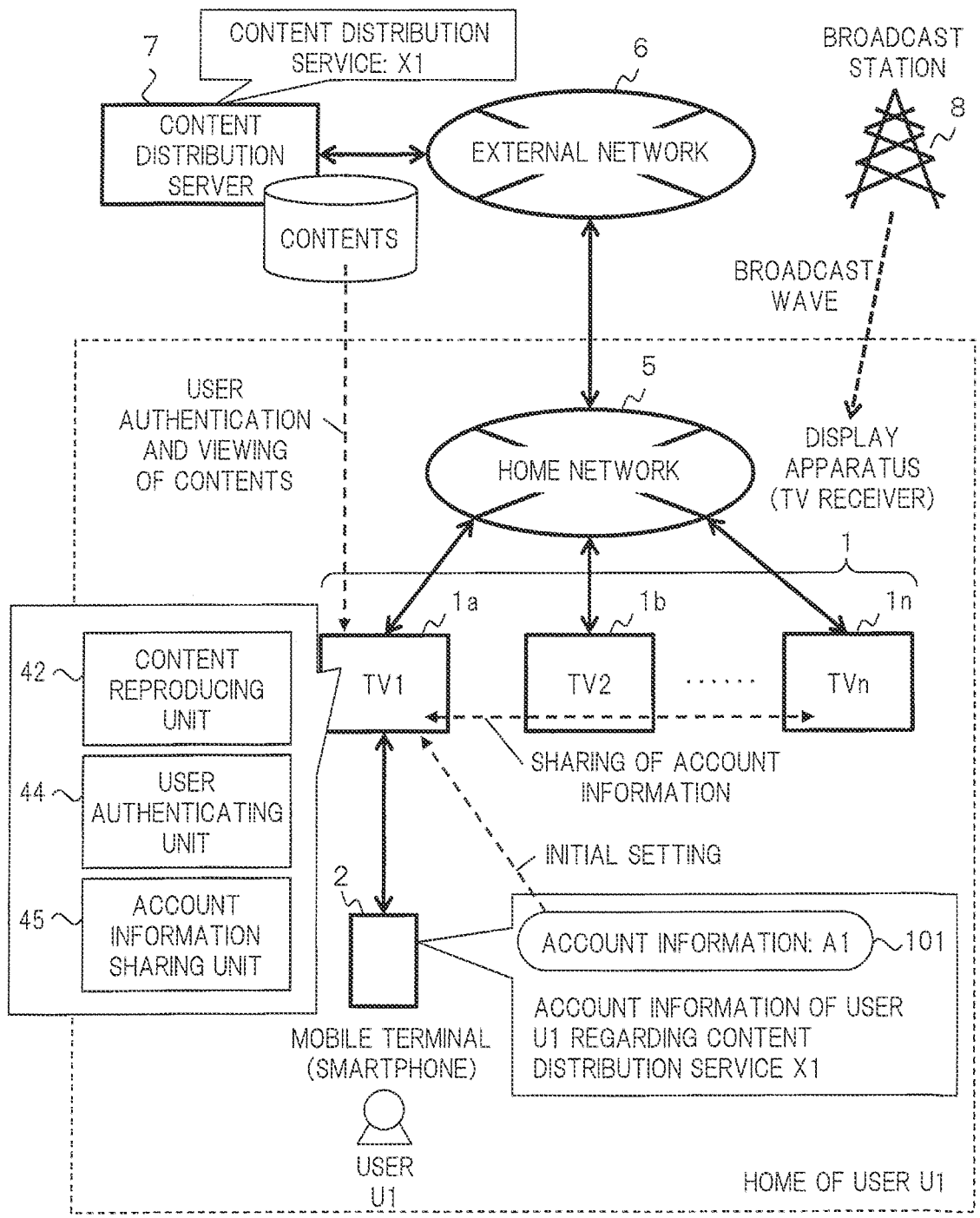
FIG. 1 is a view showing a system including a display apparatus according to a first embodiment of the present invention.

Hereinafter, embodiments of the present invention will be described in detail with reference to the drawings.

First Embodiment

An information processing method and a display apparatus according to a first embodiment of the present invention will be described with reference to FIG. 1 to FIG. 7. The information processing method according to the first embodiment is a method including steps carried out by a content viewing system including the display apparatus according to the first embodiment.

[Content Distribution Service, User Authentication, and Account Information]

A content distribution service, user authentication, account information, and the like, which are a presupposition and an application target according to the following embodiments, will first be described. As the content distribution service, there are an IPTV service and the like. The IPTV service is a service to distribute contents, such as a movie film and a video distribution program, which contain a video, an audio, character information and the like, to an apparatus of a user on the Internet. The apparatus of the user is a content reproducing apparatus, and is a display apparatus such as a mobile terminal and a TV receiver.

The apparatus has account information for allowing the user to view contents by using the content distribution service. The user is registered as a regular user to a content distribution server of a service provider by registering the account information and the like. The content distribution server carries out user authentication by using the account information in order to control authority of services and contents. The user and the apparatus are required to obtain certification by using the account information when to use a service and view contents. The control of authority using the authentication allows violation of laws, such as unapproved copy, movement, change and the like regarding the contents, to be prevented. The authentication may be requested at the time of log-in to the content distribution service, or may be requested when to reproduce each of contents.

For example, the content distribution server carries out user authentication. The content distribution server compares and checks the registered account information with account information received from the apparatus of the user, thereby carrying out the user authentication. As the authentication, apparatus authentication may be carried out in addition to the user authentication. The apparatus authentication is authentication regarding the apparatus that the user uses to view contents. In the apparatus authentication, it is confirmed whether the apparatus is a permitted apparatus or recommended apparatus or not.

The account information is information that is associated with an account set to the user for each content distribution service. The account information is information on a combination of a user ID and a password, for example. However, it is not limited to this. As the user authentication, biometrics authentication may be included. In that case, information for the biometrics authentication may be contained in the account information.

Means for predetermined protection, for example, encryption or the like may be applied to the account information and contents to be distributed. For example, contents are encrypted in advance in a predetermined method, and key information for decoding is exchanged separately. The key information is managed together with a content reproducing condition.

In the content distribution service, a usage fee is often charged by the service provider. The charging is carried out in a predetermined method, and charging information is recorded. For example, the usage fee is calculated on the basis of counts when to accumulate data and view contents in the apparatus of the user.

The same user basically reproduces contents of the content distribution service by the same apparatus, but there is a service in which a plurality of users and a plurality of apparatuses are permitted to reproduce contents under a predetermined condition. As a content distribution method, there are streaming, download, progressive download, and the like. Contents may accompany a program such as application software. The program operates when to reproduce the contents by the apparatus of the user.

[Mobile Terminal, Display Apparatus, and Account Setting Work]

The account information may be provided so as to be associated with the mobile terminal that is the apparatus of the user, for example. Namely, its account information may be stored in storage means of the mobile terminal. For example, the user inputs the account information into the mobile terminal. Alternatively, the service provider or an apparatus on a network inputs the account information into the mobile terminal. The user can use the content distribution service, that is, view contents on the mobile terminal by using the account information. The embodiment is one in which it is considered the case where even a display apparatus of a home network can use the content distribution service by using account information associated with a mobile terminal and that the mobile terminal has.

The embodiment premises a state where a mobile terminal has account information. It is shifted from the state to a state where even a display apparatus of a home network of the user can use the content distribution service by using the account information. At the time of the user authentication for viewing contents on the display apparatus, the account information that the mobile terminal has is used.

In order to do so, conventionally, the user is required to carry out a work to set the account information that the mobile terminal has to each of display apparatuss that are connected to the home network. In order to allow all of the display apparatuss to view contents, it is necessary to separately set the account information to each of the display apparatuss. Labor of the user becomes larger in the work including the settings.

Thus, in the embodiment, a mechanism to automate a process to register account information that a mobile terminal has to a plurality of display apparatuss in home, and a mechanism to share the account information of the mobile terminal with the plurality of display apparatuss of a home network are provided. These mechanisms can improve convenience in a case where the account information of the mobile terminal can be used by the plurality of display apparatuss in the home. In the embodiment, an account sharing function corresponding to these mechanisms is provided.

[Content Viewing System]

FIG. 1 shows a configuration of the content viewing system that is a system including the display apparatus according to the first embodiment. The content viewing system includes a display apparatus 1, a mobile terminal 2, a home network 5, an external network 6, a content distribution server 7, a broadcast station 8, and the like.

The display apparatus 1 is a TV receiver, and is the content reproducing apparatus that can receive and reproduce contents. The display apparatus 1 is an apparatus that has, as a function to receive and reproduce a broadcast program and contents, a displaying function to display the contents and the like on a screen. As the display apparatus 1, a plurality of display apparatuss 1 connected to the home network 5 of the user is provided. In FIG. 1, as the plurality ("n") of display apparatus 1, a display apparatus 1a, a display apparatus 1b, . . . , and a display apparatus 1n are provided. In this regard, names assigned to the respective display apparatuss 1 are indicated by "TV1" to "TVn".

As the display apparatus 1, various kinds of apparatuses, such as a liquid crystal display, a projection-type video display apparatus (projector), a PC, a monitoring device, a tablet device, a recorder, a set-top box, and a video game machine, can be applied. In the case of the recorder or the set-top box, the display apparatus 1 does not includes the displaying function. However, such a display apparatus 1 can be applied in form of connecting to other apparatus provided with a displaying function and working together.

The home network 5 is constructed in a house, which is in home of the user, a store or the like. A plurality of TV receivers that is the plurality of display apparatus 1 is connected to the home network 5. The home network 5 is in the control of a certain user (referred to as a "user U1"), and is a network that the other users cannot use basically. The home network 5 is constructed by an apparatus such as a router and a switch, cables and the like, for example. The user uses these apparatuses by purchasing or leasing them.

The home network 5 is a communication network compatible with a communication interface corresponding to a wireless LAN such as Wi-Fi. The home network 5 and the display apparatus 1 are connected to each other via the communication interface. Wi-Fi is standard specification of the wireless LAN, which is formulated by IEEE's standard "IEEE 802.11a/IEEE 802.11b". The home network 5 may be a communication network compatible with a communication interface corresponding to a wired LAN. The home network 5 can be connected to the external network 6 such as the Internet. The home network 5 has a communication interface to the external network 6, for example, an optical communication interface.

The content distribution server 7 is connected to the external network 6. The content distribution server 7 is managed by the service provider, and is a server apparatus that provides a predetermined content distribution service. The content distribution server 7 holds and manages the contents. The content distribution server 7 distributes the contents in accordance with a request from the display apparatus 1 that is connected via the external network 6.

The contents are a movie film, a video distribute program, and the like, which contain a video, an audio, character information and the like. The contents contain content data and content information. The content data are data such as a video. The content information is information for management and control regarding the contents, metadata, and the like.

The broadcast station 8 provides the broadcast program and the like by means of broadcast waves. The TV receiver that is the display apparatus 1 has a function to receive the broadcast waves, a function to reproduce the broadcast program and the like, and a function to display the broadcast program on the screen.

Each of the plurality of display apparatuss 1 of the home network 5 can give and receive information with an external server and the like including the content distribution server 7 through the home network 5 and the external network 6. Each device can use a content distribution service of the content distribution server 7 by carrying out authentication using the account information, and can receive and reproduce contents. The display apparatus 1 communicates with the content distribution server 7 via the home network 5 and the external network 6 on the basis of a user operation. The display apparatus 1 transmits, to the content distribution server 7, a content reproducing request and user authentication information containing the account information for the user authentication. The display apparatus 1 receives contents from the content distribution server 7 after success of the user authentication, and reproduces the contents. This makes it possible for the user to view the contents through the display apparatus 1.

The plurality of display apparatuss 1 in FIG. 1 has a similar configuration and the same functions. They are not limited to this. In the plurality of display apparatuss 1, a display system, an auxiliary function and the like other than essential elements, for example, may be different from each other, or different types of devices may be mixed. In FIG. 1, the plurality ("n") of display apparatuss 1 has already been installed and connected in the home network 5 at an initial state. It is not limited to this, and addition, removal, exchange or the like may occur in the home network 5 appropriately.

The mobile terminal 2 of the user can be applied to various kinds of apparatuses including a smartphone, a tablet and the like. The mobile terminal 2 has a known configuration including a wireless communication function and the like. Each of the mobile terminal 2 and the display apparatus 1 has a communication interface for connecting to and communicating with each other in home. This communication interface may be wireless one or wired one, and may be even a short-range communication interface.

The mobile terminal 2 has account information 101. The account information 101 is at least temporarily stored in storage means of the mobile terminal 2. In the example of FIG. 1, the mobile terminal 2 has account information (which is indicated by "A1") 101 of a user U1, which is associated with the content distribution service (which is indicated by "X1") of the content distribution server 7. This account information 101 is a target to be set to the display apparatus 1.

The mobile terminal 2 may include a program for working together with the display apparatus 1, and the like. The program may be an application for using the account sharing function of the display apparatus 1. The application may cause the mobile terminal 2 to display a screen provided by the account sharing function.

Further, the program for working together with the display apparatus 1 may be an application for giving an instruction to the display apparatus 1 from the mobile terminal 2 to use a function of the display apparatus 1. Namely, the application may be an application for using the mobile terminal 2 as a remote controller of the display apparatus 1. In this case, the mobile terminal 2 may be used as input means against the display apparatus 1.

The mobile terminal 2 transmits, on the basis of a user input operation, an instruction for a predetermined control operation to the display apparatus 1 in a communication connection state with the display apparatus 1. The display apparatus 1 receives the instruction from the mobile terminal 2, and carries out an operation corresponding to the predetermined control operation in accordance with the instruction.

The display apparatus 1 includes, as processing units that are constituent elements, a content reproducing unit 42, a user authenticating unit 44, and an account information sharing unit 45. The content reproducing unit 42 carries out a process to receive and reproduce contents, and display the contents on a screen in the display apparatus 1. The user authenticating unit 44 carries out a process related to the user authentication from the content distribution server 7 in the display apparatus 1 by using the account information. The account information sharing unit 45 is an element that realizes the account sharing function. The account information sharing unit 45 works together with the user authenticating unit 44 to carry out a process to cause the plurality of display apparatuss 1 of the home network 5 to share the account information of the mobile terminal 2. Details of each unit will be described later.

[Content Distribution Server]

Figure 2:
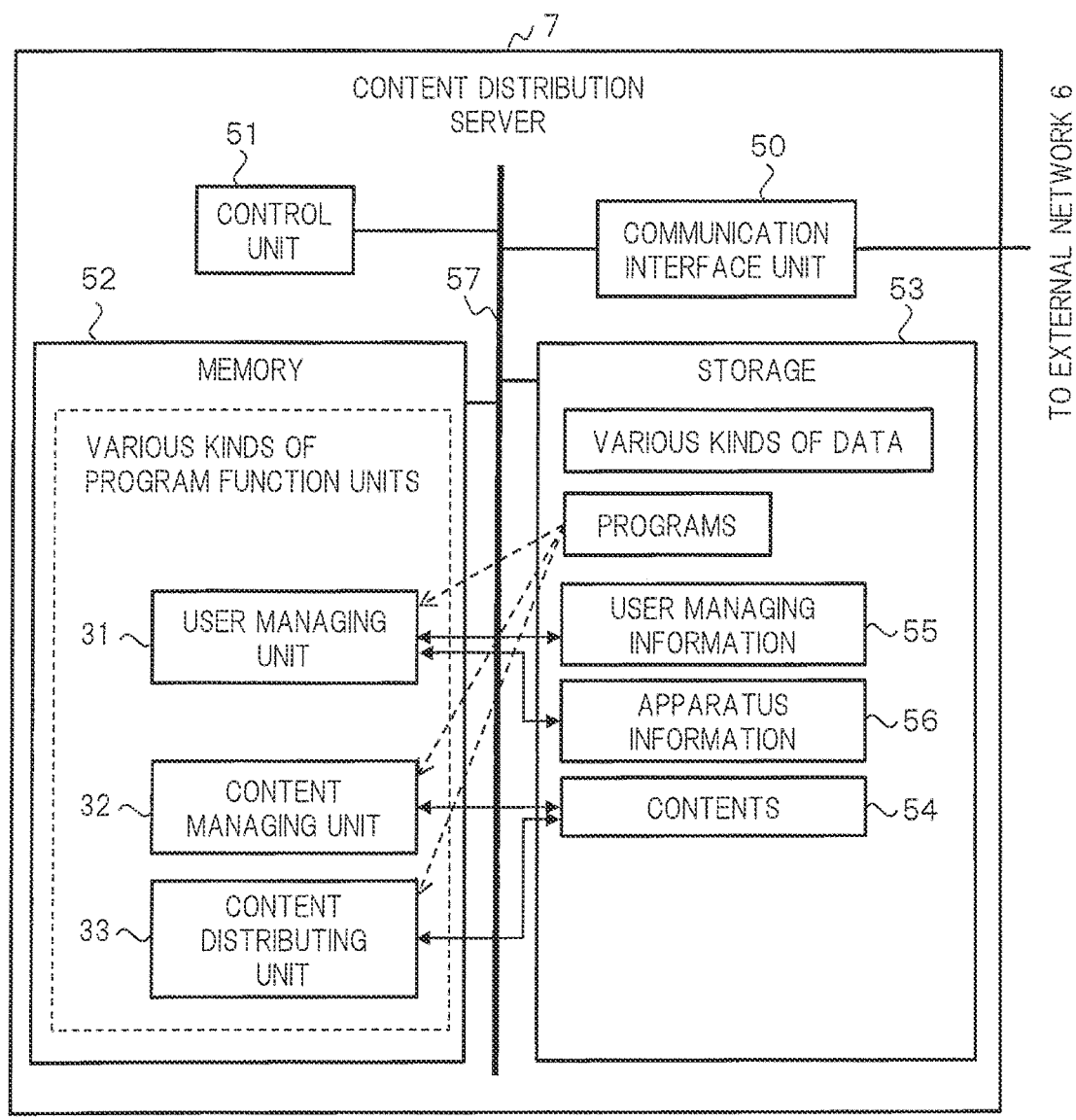
FIG. 2 is a view showing a configuration of a content distribution server according to the first embodiment.

FIG. 2 shows a functional block configuration of hardware and software of the content distribution server 7. The content distribution server 7 includes a communication interface unit 50, a control unit 51, a memory 52, a storage 53 and the like, which are connected to each other via a bus 57.

Various kinds of data, programs such as an application program, various kinds of information generated by the application program, contents 54, user managing information 55, apparatus information 56, and the like are stored in the storage 53.

The control unit 51 controls the content distribution server 7. The control unit 51 develops from the storage 53 to the memory 52 and carries out the developed programs, thereby configuring various kinds of program function units in the memory 52. Various kinds of functions of the content distribution server 7 are realized by the various kinds of program function units. The various kinds of program function units contain a user managing unit 31, a content managing unit 32, and a content distributing unit 33.

The communication interface unit 50 has a communication interface with the external network 6 to connect to the external network 6 and carry out a communicating process. The communication interface unit 50 transmits and receives information to and from the display apparatus 1 via the external network 6 and the home network 5.

The user managing unit 31 includes a function to carry out the user authentication and the apparatus authentication, and manages information for authentication in the user managing information 55 and/or the apparatus information 56 of the storage 53. The user managing unit 31 distinguishes the user of the display apparatus 1 by means of the user authentication using the account information.

The user managing information 55 is information for the user authentication containing the account information of the user. The apparatus information 56 is information for the apparatus authentication. Information containing the account information and user basic information is managed in the user managing information 55 in a table form, for example. The user basic information is information such as a name, address, and contact address. Key information, resume information, charging information, and the like may be managed in the user managing information 55. The resume information is information such as a content reproduction stopping position in the apparatus of the user.

The content managing unit 32 accumulates and manages contents as a distribution target in the storage 53 as the contents 54. The contents 54 contain the content data and the content information. The contents 54 may be stored in an external apparatus of the content distribution server 7, for example, a DB server or the like on the external network 6. The contents 54 may contain applications, accompanying information, and the like. This application is a program that is transmitted together with the content data and used when to reproduce the contents on the display apparatus 1, for example.

As examples of the content information, there are a content ID, a format, explanatory information, a size, a target apparatus, charge information, a viewing period, and the like. The explanatory information contains a genre, a title, and the like. The target apparatus is information indicating an apparatus suitable for display of the contents and execution of the application. The charge information is information for managing a usage charge of the content distribution service.

The content distributing unit 33 carries out a process to distribute contents based on the contents 54 to the display apparatus 1 and the mobile terminal 2, which is the apparatus of the user, through the communication interface unit 50. The content distributing unit 33 carries out a control to distribute contents in accordance with performance of the apparatus of the user, for example, a process to distribute the content data with suitable resolution.

The content distribution server 7 carries out the user authentication by the user managing unit 31 from the apparatus of the user when to log in the content distribution service, or when to receive the content reproducing request. At that time, the user managing unit 31 receives user authentication information containing the account information from the apparatus of the user. Further, in a case where the apparatus authentication is to be carried out, the user managing unit 31 receives apparatus information, for example, an apparatus ID of the display apparatus 1 from the apparatus of the user. The user managing unit 31 refers to the account information in the user managing information 55 to compare and check it with the account information from the apparatus of the user and determine a result of the user authentication. In a case where information of the both coincides with each other, the user managing unit 31 determines a result as success. In a case where they do not coincide with each other, the user managing unit 31 determines the result as failure. Further, in a case where a predetermined condition according to the content distribution service is not satisfied, the user managing unit 31 determines the result as failure. The user managing unit 31 transmits a response expressing the result of the authentication to the apparatus of the user. In a case where the result of the user authentication is success, the content distribution server 7 permits to receive and reproduce the contents in the apparatus of the user. The contents specified by the contents 54 is distributed to the apparatus of the user by the content distributing unit 33.

Although it complies with the content distribution service, a plurality of accounts can be assigned to one display apparatus 1 or a plurality of display apparatuss 1 with respect to the account. Further, a dependency relation among the plurality of accounts can be set with respect to the account.

[Hardware Configuration of Display Apparatus]

Figure 3:
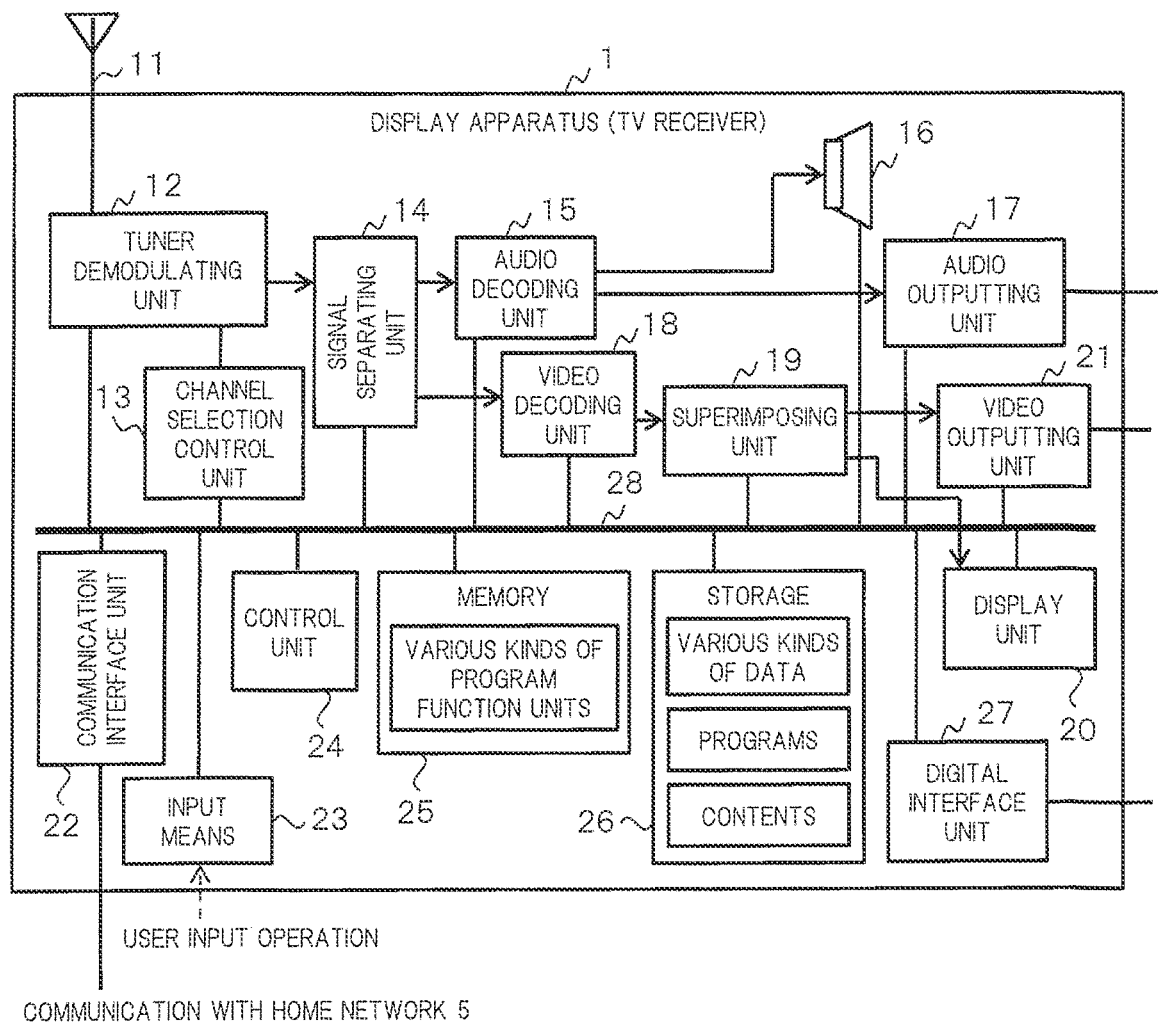
FIG. 3 is a view showing a hardware configuration of the display apparatus according to the first embodiment.

FIG. 3 shows a hardware configuration of a TV receiver that is the display apparatus 1 according to the first embodiment. The display apparatus 1 is connected to an antenna 11, and includes a tuner demodulating unit 12, a channel selection control unit 13, a signal separating unit 14, an audio decoding unit 15, a speaker 16, an audio outputting unit 17, a video decoding unit 18, a superimposing unit 19, a display unit 20, a video outputting unit 21, a communication interface unit 22, input means 23, a control unit 24, a memory 25, a storage 26, a digital interface unit 27, and the like. The respective units are connected to each other via a bus 28.

Various kinds of data, programs such as an application program, various kinds of information generated by the application program, contents received by distribution, and the like are stored in the storage 26.

The control unit 24 controls the display apparatus 1. The control unit 24 develops a program from the storage 26 in the memory 25 and carries out the program. This causes the various kinds of program function units to be configured in the memory 25. Various kinds of functions of the display apparatus 1 are realized by the various kinds of program function units.

The input means 23 is an input device, an input interface or the like that receives a user input operation for the display apparatus 1, such as an operation panel, a remote controller, a keyboard, a mouse, a touch panel, for example. The user can instruct and set the display apparatus 1 by using the input means 23. The control unit 24 receives the user input operation through the input means 23 to control each unit of the channel selection control unit 13, the signal separating unit 14, the superimposing unit 19, the various kinds of program function units, the storage 26, the communication interface unit 22, and the like.

The tuner demodulating unit 12 is controlled by the channel selection control unit 13 to turn to a desired channel of the service. The tuner demodulating unit 12 selects, as a channel, a digital broadcasting signal received from the broadcast station 8 via the antenna 11, and demodulates it to generate a transport stream. The channel selection control unit 13 receives a service channel-selecting instruction via the input means 23 to control the tuner demodulating unit 12 so as to switch channels to be selected. The channel selection control unit 13 controls the tuner demodulating unit 12 so as to switch to a channel number of a service or the like that broadcasts a program while currently being broadcasted by an instruction from the various kinds of program function units.

The communication interface unit 22 has a communication interface with the home network 5 and a communication interface with the mobile terminal 2 to carryout respective communicating processes. The communication interface unit 22 is connected to the home network 5 via a communication interface compatible with a wireless LAN and the like. The communication interface unit 22 carries out the communicating process with a device on the external network 6 via the home network 5. The communication interface unit 22 can receive a content stream, a video/audio stream, an application program and the like as contents of the IPTV service from the content distribution server 7. The communication interface unit 22 carries out the communicating process with the mobile terminal 2 directly or via the home network 5.

Data and information received through the communication interface unit 22 are stored in the storage 26 or the like. The communication interface unit 22 may have a function to directly communicate with an external apparatus via a predetermined communication interface in addition to or in place of a communicating function with the home network 5. The communication interface may be a wireless LAN such as Wi-Fi, IrDA (registered trademark), Bluetooth (registered trademark), NFC (Near Field Communication) or the like.

The signal separating unit 14 separates the transport stream obtained by the tuner demodulating unit 12 and a stream of contents obtained through the communication interface unit 22 into types such as video data, audio data, caption sentence data, program information and the like. The signal separating unit 14 has a function to obtain the program information and transmit it to the other processing unit. In a case where there is a data transmitting request from the other processing unit, the signal separating unit 14 transmits specified data to a requestor.

The audio decoding unit 15 decodes the audio data separated by the signal separating unit 14. Audio information decoded by the audio decoding unit 15 is outputted from the speaker 16. The audio information decoded by the audio decoding unit 15 may be outputted from the audio outputting unit 17 to the external apparatus. The video decoding unit 18 decodes the video data separated by the signal separating unit 14. The video information decoded by the video decoding unit 18 is transmitted to the superimposing unit 19.

The superimposing unit 19 superimposes an EPG image and an OSD image created by the various kinds of program function units, an image generated from various kinds of information separated by the signal separating unit 14 onto the decoded video information from the video decoding unit 18. The various kinds of information contain subtitle information and the like. The superimposing unit 19 carries out composition of a browser displaying screen created by a browser engine (will be described later) and a video signal, switching of its selection and the like. The video information through the superimposing unit 19 is transmitted to the display unit 20 and displayed on the display unit 20.

The display unit 20 is configured by a liquid crystal panel, a projection optical system, or the like, for example. The display unit 20 displays the video information on a screen. The video information contains a video of a broadcast via the tuner demodulating unit 12, a video of distribution via the communication interface unit 22, user interface information, the browser displaying screen, an image in the storage 26, something generated by the application program, and the like. The video information through the superimposing unit 19 may be outputted from the video outputting unit 21 to the external apparatus. The digital interface unit 27 outputs the transport stream separated by the signal separating unit 14 to the outside as digital data without decoding of a video or an audio.

In a case where the display apparatus 1 is an apparatus such as the recorder or the set-top box, the display apparatus 1 has a configuration in which elements such as the display unit 20 and the speaker 16 are omitted. Thus, the display apparatus 1 has apparatuses such as the TV receiver, the monitoring device and the speaker, which are connect to the outside of this apparatus such as the recorder. Videos, audios and the like are transferred from the apparatus such as the recorder to the external apparatus to cause the external apparatus to output them. In a case where the display apparatus 1 is a PC or the monitoring device, the display apparatus 1 has a configuration in which a function to receive broadcast waves, that is, the antenna 11, the tuner demodulating unit 12 and the like are omitted.

[Software Configuration of Display Apparatus]

Figure 4:
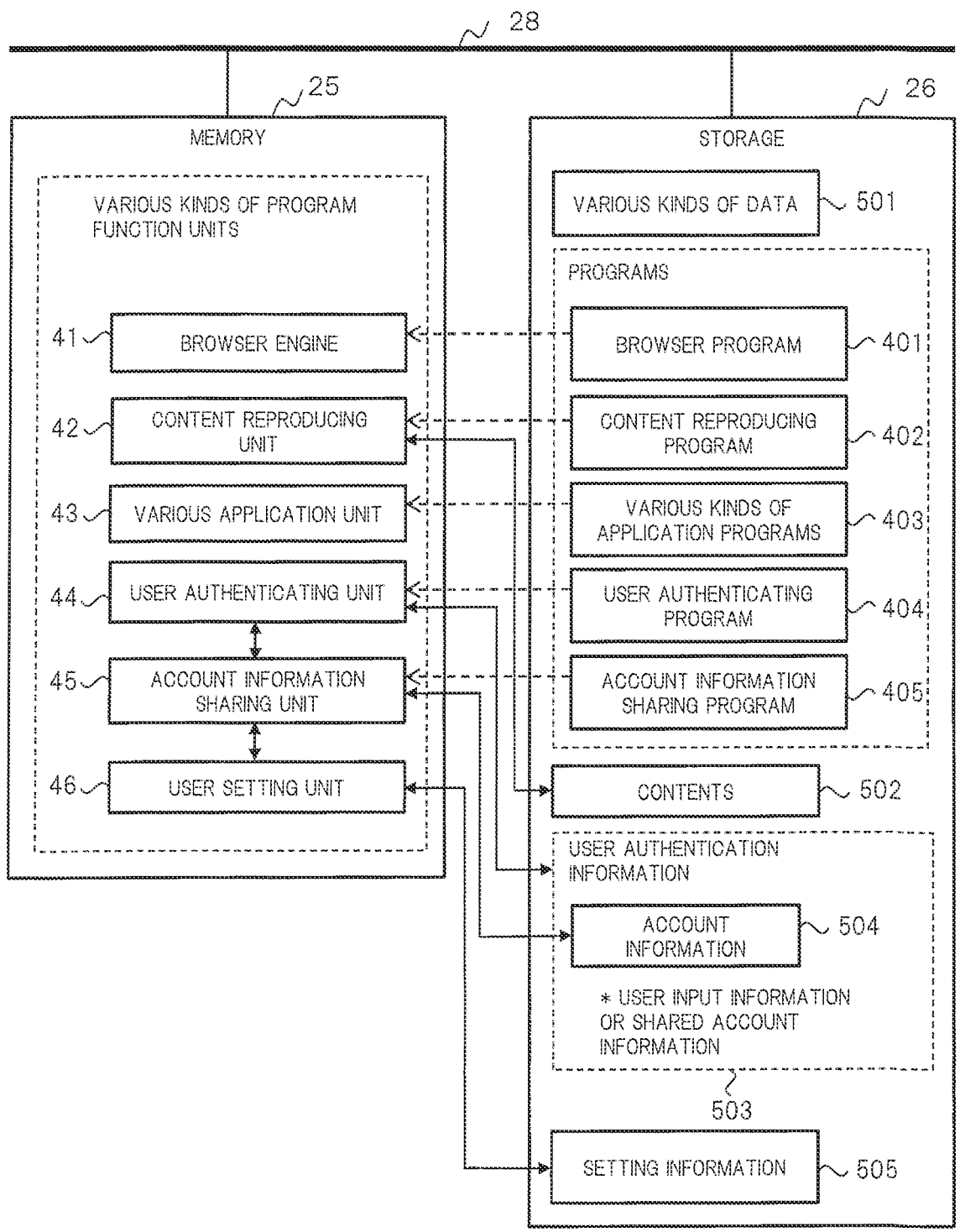
FIG. 4 is a view showing a software configuration of the display apparatus according to the first embodiment.

FIG. 4 shows a configuration of the memory 25 and the storage 26 as a software configuration of the display apparatus 1 in FIG. 2. Various kinds of data 501, programs, contents 502, user authentication information 503 containing account information 504, setting information 505, and the like are stored in the storage 26. The programs include a browser program 401, a content reproducing program 402, various kinds of application programs 403, a user authenticating program 404, and an account information sharing program 405. By developing the respective programs to the memory 25, a browser engine 41, the content reproducing unit 42, a various application unit 43, the user authenticating unit 44, the account information sharing unit 45, a user setting unit 46, and the like are composed.

The account information 504 is user input information inputted by the user through the input means 23 at the time of user authentication or shared account information (will be described later). The account information 504 is information on a combination of a user ID and a password, for example. The user authentication information 503 may be stored not only in the storage 26, but also in a nonvolatile memory or external storage means (not shown in the drawings). It may contain apparatus authentication information for carrying out apparatus authentication in the user authentication information 503 or in parallel to this. The apparatus authentication information contains an apparatus ID of the mobile terminal 2 and/or the display apparatus 1, for example. As the apparatus ID, there are a MAC address, and an inherent (or unique) ID at the time of manufacture, for example. The user authentication information 503 containing the account information 504 may be one in which the user can change a value thereof, or one in which the value is determined in advance by the service provider or the like.

The browser engine 41 includes function blocks such as an HTML parser, a DB creating unit, a rendering unit, and an image processing unit. The HTML parser analyzes a logical structure of HTML data that is obtained via the control unit 24. The HTML parser can interpret the HTML data to change into internal data that is to be used in the TV receiver. The DB creating unit generates a database regarding a structure of the HTML data. The rendering unit generates, on the basis of the database, a layout structure containing information with an expression form determined in each tag. The rendering unit generates, on the basis of the layout structure, the browser displaying screen in accordance with data in which magnitude, a position, and an image are taken. The image processing unit converts an obtained image file into image data on the basis of image file information that is specified by an image tag in the HTML data.

The content reproducing unit 42 receives contents from the content distribution server 7 through the communication interface unit 22, and stores them in the storage 26 as the contents 502. The content reproducing unit 42 carries out a process to reproduce the contents 502, that is, a process to display a video of the contents 502 on a screen of the display unit 20, and the like.

When to carry out the user authentication from the content distribution server 7, the user authenticating unit 44 carries out a process related to the user authentication by using the user authentication information 503 containing the account information 504. When to carry out the user authentication, the user authenticating unit 44 transmits the user authentication information 503 to the content distribution server 7 via the home network 5 and the external network 6 through the communication interface unit 22. The user authenticating unit 44 receives a result of the user authentication from the content distribution server 7. The user authenticating unit 44 may display the user interface information such as the user authentication information and a message on the screen of the display unit 20 when to carry out the user authentication.

Application of the various application unit 43 indicate applications that are downloaded from the content distribution server 7 or the like in accordance with user's taste. The various application unit 43 carries out processes according to the applications.

The account information sharing unit 45 works together with the process related to the user authentication of the user authenticating unit 44. The account information sharing unit 45 carries out a process to share the account information with the plurality of display apparatuss 1 of the home network 5. The account information sharing unit 45 gets the account information associated with the mobile terminal 2 and had by the mobile terminal 2 from the mobile terminal 2 directly or via the home network 5. The account information sharing unit 45 registers the account information into the user authentication information 503 as the account information 504. The account information sharing unit 45 sets the account information as the shared account information of the plurality of display apparatuss 1 of the home network 5. The account information sharing unit 45 controls the account information among the display apparatuss 1 so that the account information can be shared with the plurality of display apparatuss 1 and used for the user authentication.

The account information sharing unit 45 controls so as to use the account information as one of input means of the user authentication information 503 to the user authenticating unit 44. Namely, the account information sharing unit 45 provides alternate means to input the account information through the input means 23. The user normally inputs the account information through the input means 23 when to carry out the user authentication in the display apparatus 1. On the other hand, in the embodiment, the account information 504 registered as the shared account information is used for a process related to the user authentication of the user authenticating unit 44 by using the account sharing function by the account information sharing unit 45. This makes it possible for the user to omit an account information inputting operation. Otherwise, details of the account information sharing unit 45 will be described later.

The user setting unit 46 realizes a user setting function of the display apparatus 1. The user setting unit 46 causes the display unit 20 to display a setting screen on the basis of a user input operation. The user can carry out overall settings for the display apparatus 1 on the setting screen on the basis of the user input operation. The user setting unit 46 manages the setting information 505 for managing a setting state in the storage 26, a nonvolatile memory or the like. The other processing unit carries out an operation in accordance with the setting state of the setting information 505.

[User Authentication]

Timing of the user authentication of the content distribution service and a procedure example for communication are as follows. In a case where user authentication is to be carried out when to log in the content distribution service, it is as follows. The display apparatus 1 of the user accesses the content distribution service in order to log therein on the basis of a user operation. The content distribution server 7 transmits a user authentication information request to the display apparatus 1 for user authentication at the time of log-in. When the user authentication information request is received, the display apparatus 1 transmits user authentication information containing account information to the content distribution server 7. When the user authentication information is received, the content distribution server 7 compares and checks it with registered user authentication information to carryout the user authentication. In a case where a result of the user authentication is success, the content distribution server 7 transmits a response that the log-in is permitted. In a case where the result is failure, the content distribution server 7 transmits a response that the log-in is not permitted.

A portal screen to view contents may be provided to the apparatus of the user who is a regular user for whom the user authentication is succeeded. The display apparatus 1 displays the portal screen on the basis of communication with the content distribution server 7. The portal screen contains content list information and the like. The user is allowed to select or search target contents to be viewed on the portal screen. The user can view contents in a log-in state without requiring user authentication. The display apparatus 1 transmits a content reproducing request including a content ID of contents selected by the user to the content distribution server 7. When the content reproducing request is received, the content distribution server 7 distributes the specified contents.

In a case where user authentication for each content is carried out, it is as follows. The display apparatus 1 of the user transmits the content reproducing request, which contains the content ID of the contents selected by the user via the portal screen or the like, to the content distribution server 7. The content distribution server 7 transmits the user authentication information request to the display apparatus 1 for user authentication for each of the contents. When the user authentication information request is received, the display apparatus 1 transmits the user authentication information containing the account information to the content distribution server 7. The content distribution server 7 carries out the user authentication similarly. In a case where a result of the user authentication is success, the content distribution server 7 transmits a response that reproduction of the contents is permitted, and distributes the specified contents. In a case where the result is failure, the content distribution server 7 transmits a response that reproduction of the contents is not permitted. The content reproducing request and the user authentication information may be transmitted together.

[Initial Setting]

An operation and processing at the time of initial setting regarding the account information according to the first embodiment will be described with reference to FIG. 5 and the like. Here, the initial setting is setting necessary to make a state where the user is allowed to view contents via the display apparatus 1 in the system of FIG. 1.

[Operating Sequence]

Figure 5:
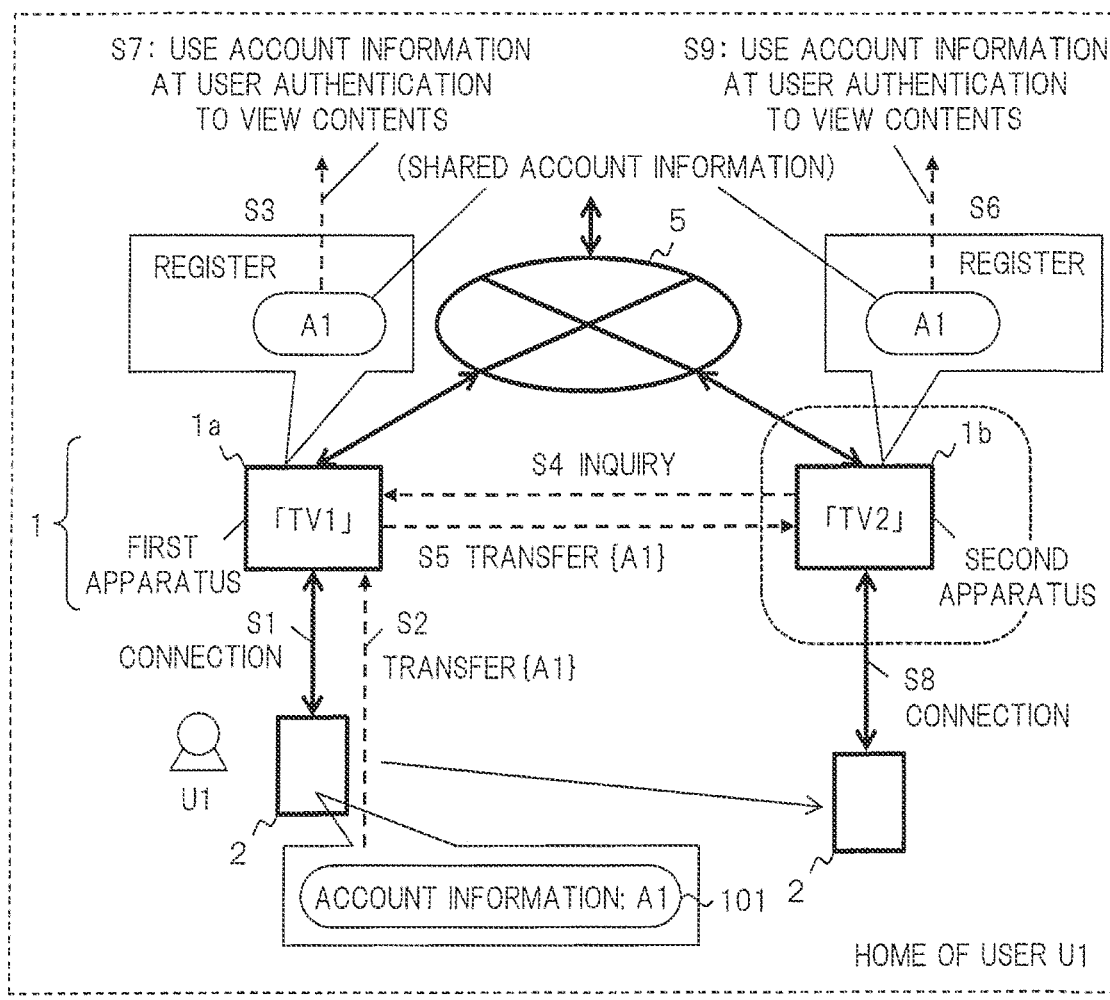
FIG. 5 is a view showing an example of an operating sequence at the time of initial setting according to the first embodiment.

FIG. 5 shows an example of an operating sequence between apparatuses at the time of initial setting according to the first embodiment. In FIG. 5, each of the plurality of display apparatuss 1 has the same functions including the account information sharing unit 45. In the example of FIG. 5, the mobile terminal 2 of the user U1 is connected to a certain display apparatus 1*a* of the home network 5 to transfer and register the account information 101. Then, the account information 101 is shared with the plurality of display apparatuss 1*a* to 1*n* of the home network 5 so as to be available. The initial setting of FIG. 5 includes an operation in which the account information 101 that the mobile terminal 2 has is registered in the plurality of display apparatuss 1 of the home network 5 as the shared account information. There are Steps S1 to S9 in FIG. 5. Hereinafter, the operating sequence will be described in the order of Steps.

(S1) The mobile terminal 2 of the user U1 is connected to any display apparatus 1 of the home network 5, for example, the display apparatus 1*a* by wireless connection or the like. The display apparatus 1*a* to which the mobile terminal 2 is connected in this manner is also referred to as "first apparatus" for convenience of explanation.

(S2) The account information sharing unit 45 of the display apparatus 1*a* that is the first apparatus communicates with the mobile terminal 2 to obtain the account information 101 that the mobile terminal 2 has therein by causing the display apparatus 1*a* to transfer it. At the time of this transfer, it may be transferred in response to a request from the first apparatus to the mobile terminal 2, or transferred in response to an instruction from the mobile terminal 2 to the first apparatus. Further, the user may carry out an input operation corresponding to the initial setting against the mobile terminal 2 or the display apparatus 1. The mobile terminal 2 or the display apparatus 1 may receive the input operation to carry out transfer of the account information.

(S3) The account information sharing unit 45 of the display apparatus 1*a*, which is the first apparatus registers, as the shared account information, the account information 101 obtained from the mobile terminal 2 to the account information 504 of the user authentication information 503 in the storage 26 of the display apparatus 1*a*.

(S4) On the other hand, other display apparatus 1 of the home network 5, for example, the display apparatus 1*b* does not hold account information therein at the time of the initial setting. The other display apparatus 1 such as the display apparatuss 1*b* to 1*n* is also referred to as "second apparatus" for convenience of explanation. The account information sharing unit 45 of the display apparatus 1*b* that is the second apparatus make an inquiry regarding the account information to the other display apparatus 1 of the home network 5, for example, the display apparatus 1*a*. This inquiry is an inquiry of whether to hold the account information or not, and is an inquiry containing a transfer request in a case where the account information is held.

(S5) The display apparatus 1*a* that is the first apparatus carries out a response when to receive the inquiry from the display apparatus 1*b* that is the second apparatus. The account information sharing unit 45 of the first apparatus reads out the account information, which has already been registered in its own storage as the shared account information, to transfer information containing the account information to the display apparatus 1*b* as an inquiry source, which is the second apparatus.

(S6) When the information containing the account information transferred from the display apparatus 1*a* as an inquiry destination is received as a response, the display apparatus 1*b* as the inquiry source registers the account information in the account information 504 of the user authentication information 503 in its own storage 26 as the shared account information. This causes a state where the account information is also held in the display apparatus 1*b*. The display apparatus 1*n* and the like that are the other display apparatuss 1 carry out the above operation similarly, thereby becoming a state the same account information is held in each of the display apparatuss 1. This causes a state where the initial setting has been finished. The above operation is similar even in a case where any of the plurality of display apparatuss 1 become the first apparatus and the second apparatus. For example, in a case where the mobile terminal 2 is first connected to the display apparatus 1*b*, the display apparatus 1*b* becomes the first apparatus and the other display apparatus 1 becomes the second apparatus.

(S7) Then, when user authentication with the content distribution server 7 is carried out, the display apparatus 1*a* that is the first apparatus can carry out a process related to the user authentication by using the account information, which has already been registered therein at S3, by means of the user authenticating unit 44.

(S8) Further, the mobile terminal 2 of the user U1 is then connected to the display apparatus 1*b* that is the second apparatus. In this case, the account information has already been registered in the display apparatus 1*b* at S6. For this reason, there is no need to transfer the account information from the mobile terminal 2 to the display apparatus 1*b*, and there is also no need to carry out an account registering process.

(S9) As well as the display apparatus 1*a*, when the user authentication with the content distribution server 7 is carried out, the display apparatus 1*b* that is the second apparatus can carry out the process related to the user authentication by using the account information, which has already been registered therein at S6, by means of the user authenticating unit 44.

[Processing Flow (1)]

Figure 6A:
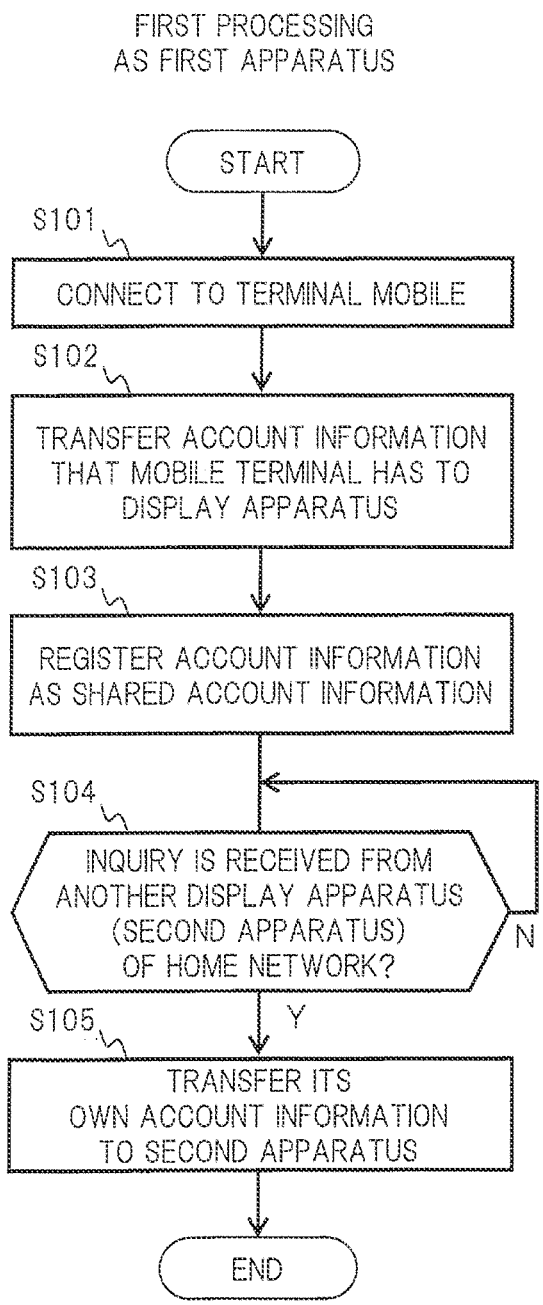
FIGS. 6A and 6B are views showing a processing flow of the display apparatus according to the first embodiment.
Figure 6B:
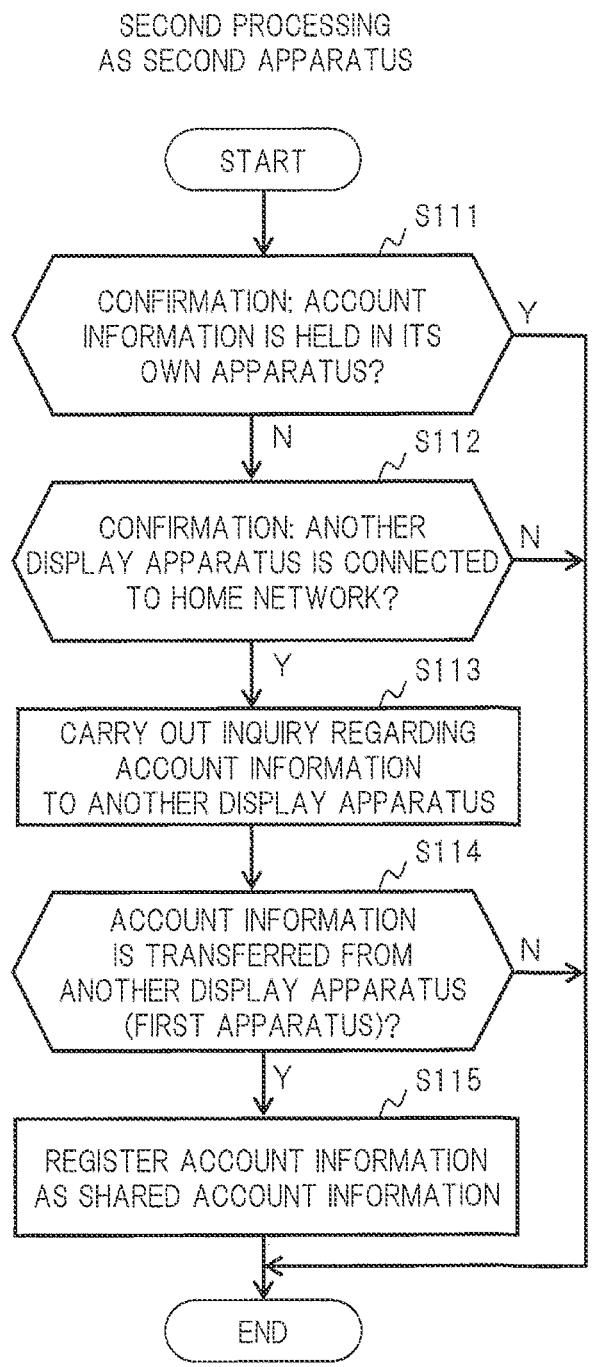

FIG. 6 shows a processing flow at the time of the initial setting in the display apparatus 1 according to the first embodiment. (A) of FIG. 6 shows a flow of first processing corresponding to the "first apparatus" of FIG. 5. (B) of FIG. 6 shows a flow of second processing corresponding to the "second apparatus" of FIG. 5. There are Steps S101 to S105 in (A) of FIG. 6. Hereinafter, the processing flow will be described in the order of Steps.

(S101) The first apparatus is connected to the mobile terminal 2.

(S102) The account information sharing unit 45 requests the mobile terminal 2 to transfer account information that the mobile terminal 2 has. This causes the account information to be transferred from the mobile terminal 2 to the display apparatus 1. The account information sharing unit 45 receives and obtains the transferred account information.

(S103) The account information sharing unit 45 registers the account information obtained at S102 in the account information 504 of the user authentication information 503 in the storage 26 as the shared account information. At this time, the account information may be transferred or delivered from the account information sharing unit 45 to the user authenticating unit 44 to register the account information by the user authenticating unit 44.

(S104) The account information sharing unit 45 waits for inquiry from the second apparatus that is another display apparatus 1 of the home network 5. Ina case where the second apparatus receives inquiry from the account information sharing unit 45 (S104-Y), the processing flow proceeds to S105.

(S105) The account information sharing unit 45 determines whether there is a problem or not even when the account information is provided to the second apparatus in response to the inquiry from the second apparatus. After it is confirmed that there is no problem, the account information sharing unit 45 reads out the shared account information held in the account information 504 of the storage 26, and transfers information containing the account information to the second apparatus that carried out the inquiry via the home network 5.

There are Steps S111 to S115 in (B) of FIG. 6. Hereinafter, the processing flow will be described in the order of Steps.

(S111) The account information sharing unit 45 of the second apparatus confirms whether the account information is held in the account information 504 of its own storage 26 or not, that is, whether the shared account information has already been registered or not. In a case where it is held (S111-Y), the processing flow terminates the process for the initial setting. In a case where it is not held (S111-N), the processing flow proceeds to S112.

(S112) The account information sharing unit 45 confirms whether the other display apparatus 1 is connected to the home network 5 or not. In this regard, this step may be omitted in a case where it is known in advance connection and the display apparatus 1 thereof. In a case where the other display apparatus 1 is connected (S112-Y), the processing flow proceeds to S113. In a case where no display apparatus 1 is connected (S112-N), the processing flow is terminated.

(S113) The account information sharing unit 45 transmits information on the inquiry regarding the account information to the other display apparatus 1 in the home network 5 via the home network 5. The other display apparatus 1 as an inquiry destination may be the first apparatus, or may be the second apparatus.

(S114) In a case where the account information is transferred to the account information sharing unit 45 as a response from the first apparatus (S114-Y), the processing flow proceeds to S115. In a case where it is not transferred, the other display apparatus 1 as the inquiry destination is the second apparatus in which the account information is not held. The account information sharing unit 45 similarly carries out an inquiry in a case where there is the other display apparatus 1. In a case where the account information is not transferred from any of the display apparatuss 1 (S114-N), the processing flow is terminated.

(S115) The account information sharing unit 45 registers the account information received from the first apparatus to the account information 504 of the user authentication information 503 in its own storage 26 as the shared account information. Herewith, the process for the initial setting is terminated.

In this regard, as a modification example, the confirmation of whether the account information is held or not and a request of transfer in the inquiry at S113 may be separated as separate communicating steps. Further, the second apparatus may similarly make an inquiry to all of the other display apparatuss 1 of the home network 5 at the time of the inquiry, or may make an inquiry to a specific display apparatus 1. For example, in a case where the first apparatus in the home network 5 is known in advance, the account information sharing unit 45 may transmit a request of transfer to only the first apparatus. Further, when to transfer the account information among the display apparatuss 1, the account information may be subjected to encryption or the like.

The account information sharing unit 45 may manage, as information, a state of holding and sharing of the account information in the plurality of display apparatuss 1 of the home network 5 in a table. For example, information on an apparatus ID, whether the account information of each of the display apparatuss 1 is held or not, a role thereof and the like may be managed in the table for each piece of account information. As the role, there are the first apparatus, the second apparatus and the like.

Effects and the Like

As described above, according to the content viewing system of the first embodiment, it is possible to reduce labor for the user to set the account information to the plurality of display apparatuss 1 of the home network 5 while securing control of authority to view contents by using the account information as a premise, and this makes it possible to user-friendly improve convenience in various environments and situations.

For example, the user may carry out a work to register the account information that the mobile terminal 2 has to the first apparatus that is one of the display apparatuss 1 of the home network 5 during the initial setting. This causes a state where the account information is automatically registered to the plurality of display apparatuss 1 of the home network 5 to become sharing available. There is no need to separately register the account information to each of the display apparatuss 1 of the home network, and this makes labor of the user smaller.

The prior art is not a technique in which it is not considered that a mobile terminal and a display apparatus work together. Even in a case where the mobile terminal has account information, it is not easy to share the account information with a plurality of display apparatuss of a home network. On the other hand, according to the first embodiment, such sharing can be easily realized by a simple operation.

The following is cited as a modification example of the first embodiment. First, for example, there is a first television and a second television as the plurality of display apparatuss 1 of the home network 5. Account information of the mobile terminal 2 has already been registered to the first television. A third television is newly added to home. An account information sharing unit 45 of the third television makes an inquiry to the other display apparatus 1 of the home network 5, for example, the first television for its own initial setting when the third television is connected to the home network 5. The first television that receives the inquiry transfers the account information to the third television. The third television registers the account information thereto, and terminates the initial setting. Namely, an account sharing function according to the modification example realizes a function to carry out registration for sharing the account information when the display apparatus 1 is connected to the home network 5.

As another modification example, it may be a form of a home system that allows communication between a plurality of display apparatuss 1 and between each of the display apparatuss 1 and an external apparatus without a home network 5. In that case, an account sharing function is a function to share account information in the home system.

First Modification Example

The following is possible as a first modification example of the first embodiment. A first apparatus that is a display apparatus 1 registers therein account information obtained from a mobile terminal 2, and immediately transfers it to second apparatuses that are the other display apparatuss 1 in a home network 5. The second apparatus that receives the account information thus immediately transferred registers the account information thereto.

Figure 7:
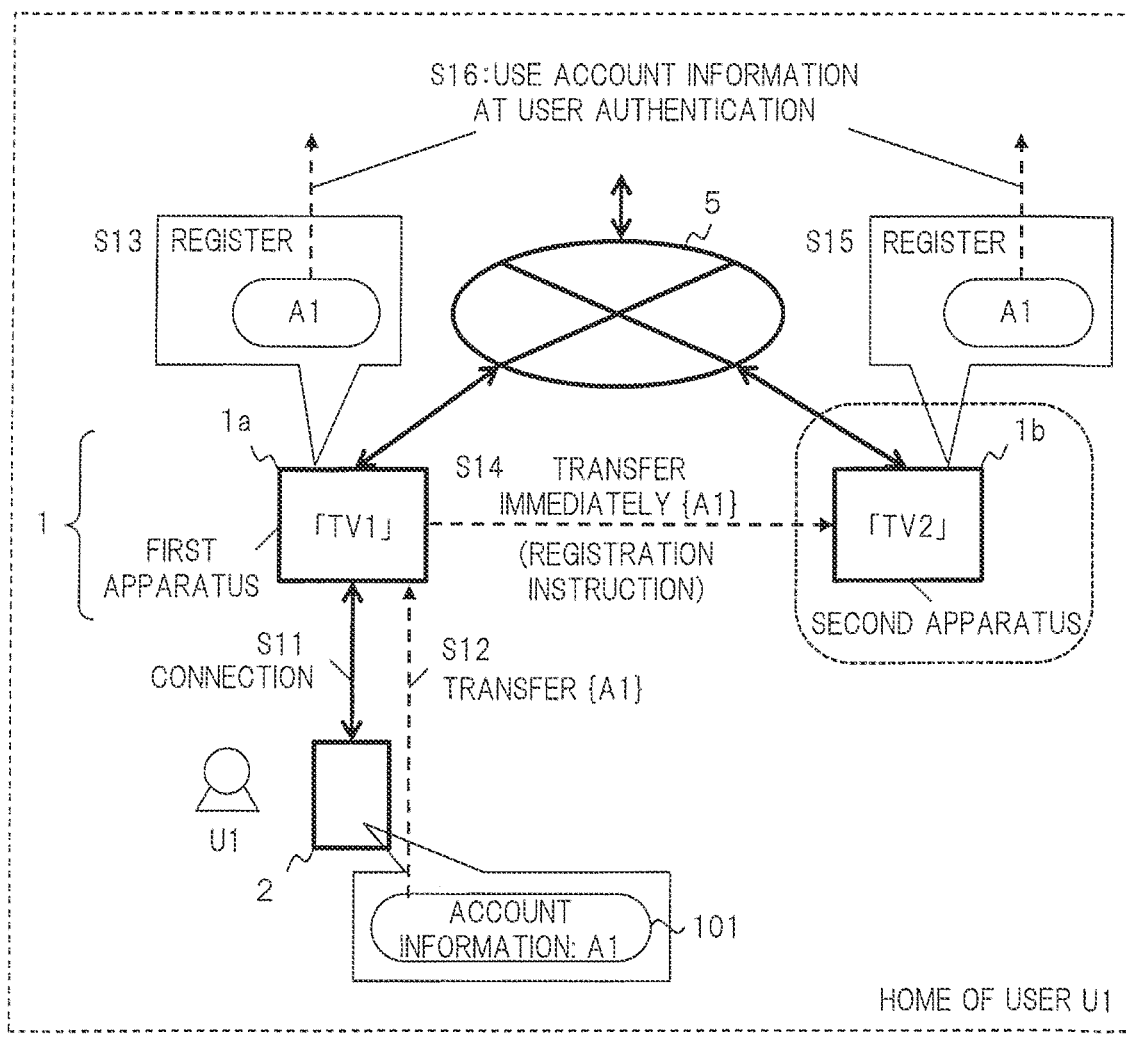
FIG. 7 is a view showing an example of an operating sequence at the time of initial setting according to a first modification example of the first embodiment.

FIG. 7 shows an example of an operating sequence between apparatuses at the time of initial setting according to the first modification example of the first embodiment. There are Steps S11 to S16 in FIG. 7. Hereinafter, the operating sequence will be described in the order of Steps.

(S11 to S13) At S11, the mobile terminal 2 of the user U1 is connected to any display apparatus 1 of the home network 5, for example, the display apparatus 1a. At S12, the account information sharing unit 45 of the display apparatus 1a that is the first apparatus causes the mobile terminal 2 to transfer the account information 101 that the mobile terminal 2 has to the display apparatus 1a to obtain it. At S13, the account information sharing unit 45 registers the account information 101 obtained from the mobile terminal 2 to the user authentication information 503 therein as the shared account information.

(S14) Moreover, the account information sharing unit 45 of the display apparatus 1a that is the first apparatus immediately transfers information containing the account information at S13 to each of the second apparatuses that are the other display apparatus of the home network 5. This information thus immediately transferred is also a registering instruction to the second apparatus. This immediate transfer may be carried out by broadcast transmission to the other display apparatuss 1 of the home network 5, for example, or may be carried out by sequential transmission to each of the other display apparatuss 1 in a predetermined order.

(S15) On the other hand, each of the second apparatuses that are the other display apparatuss 1 of the home network 5, for example, the display apparatus 1b receives the information immediately transferred at S14 from the first apparatus. The second apparatus registers the account information to the user authentication information 503 therein as the shared account information. This causes a state where the account information is also held in the display apparatus 1b. Similarly, it becomes a state where the account information is held in each of the display apparatuss 1. This causes a state where the initial setting has already been finished. The above operation is similar even in a case where any of the plurality of display apparatuss 1 become the first apparatus and the second apparatus.

(S16) Then, the display apparatus 1a or the display apparatus 1b can carry out the process related to the user authentication by using the account information that has already been registered thereto when the user authentication with the content distribution server 7 is carried out.

According to the first modification example of the first embodiment, the inquiry described above is not required, and by carrying out immediate transfer, it is possible to shorten a time required for the initial setting.

Second Embodiment

A display apparatus 1 and the like according to a second embodiment of the present invention will be described with reference to FIG. 8 to FIG. 9. A basic configuration according to the second embodiment is similar to that according to the first embodiment. Hereinafter, component parts of the second embodiment different from those of the first embodiment will be described. In the second embodiment, sharing of account information is realized in a home network 5 as well as the first embodiment. However, a processing method therefor is partly different from that of the first embodiment.

In the second embodiment, a first apparatus that is a display apparatus 1 to which account information of a mobile terminal 2 is registered among a plurality of display apparatuss 1 of the home network 5 is set to an "account server". The "account server" mentioned herein means an apparatus and a role that representatively manages account information in the home network 5. The account information is not registered to a second apparatus that is another display apparatus 1 in the home network 5. Whenever the account information is required for user authentication, the second apparatus accesses the account server that is the first apparatus, and refers to and uses the account information.

[Operating Sequence]

Figure 8:
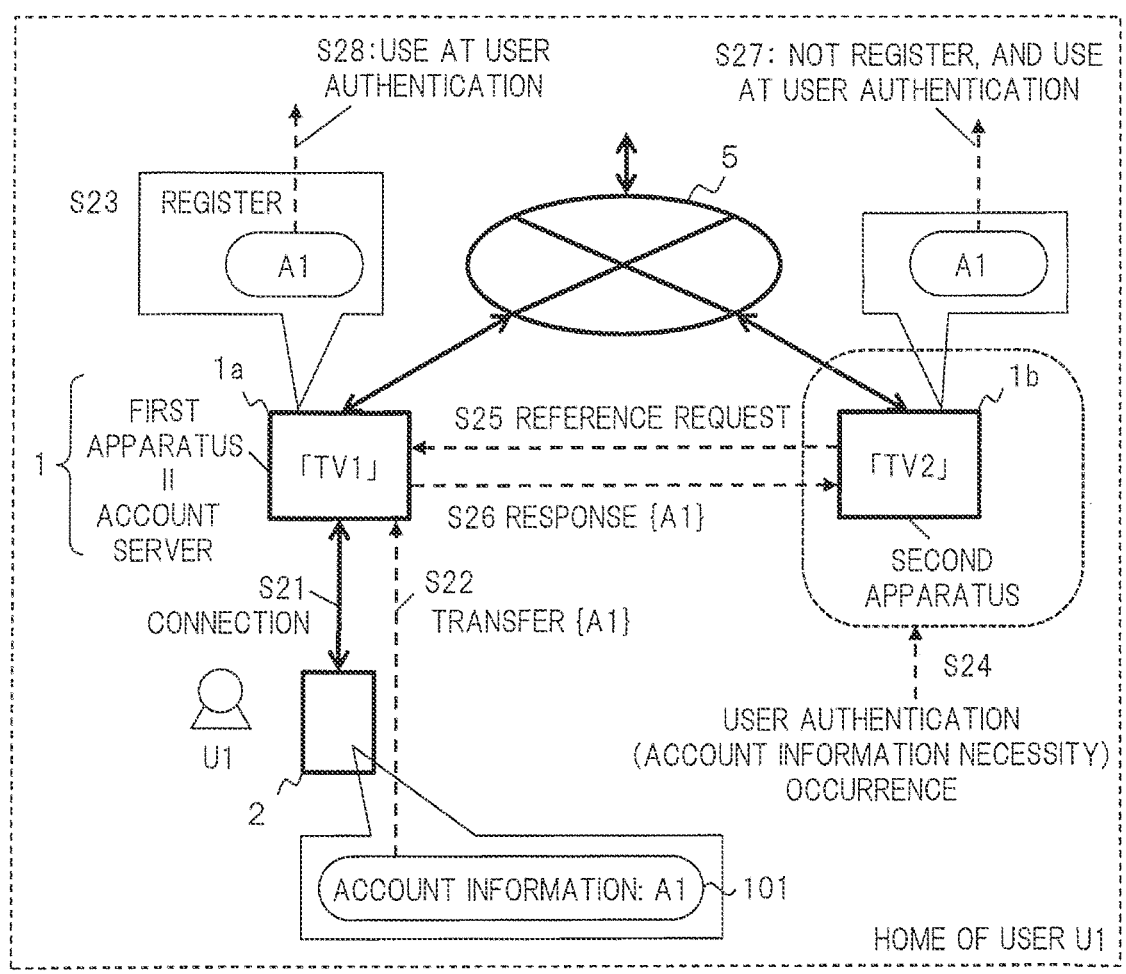
FIG. 8 is a view showing a system including a display apparatus and an example of an operating sequence at the time of the initial setting according to a second embodiment of the present invention.

FIG. 8 shows an example of an operating sequence between apparatuses at the time of initial setting according to the second embodiment. There are Steps S21 to S28 in FIG. 8. Hereinafter, the operating sequence will be described in the order of Steps.

(S21) A mobile terminal 2 of a user U1 is connected to any display apparatus 1 of the home network 5, for example, a display apparatus 1a.

(S22) Account information sharing unit 45 of the display apparatus 1a that is the first apparatus causes the display apparatus 1a to transfer account information 101 that the mobile terminal 2 has thereto, and obtains it.

(S23) The account information sharing unit 45 registers, as shared account information, the account information 101 obtained from the mobile terminal 2 in account information 504 of user authentication information 503 of its own storage 26. The display apparatus 1a that is the first apparatus becomes the account server that manages the shared account information. The initial setting is basically terminated up to this point.

In this regard, after S23, a step of notifying, from the display apparatus 1a that is the first apparatus, each of second apparatuses that are the other display apparatuss 1 that the display apparatus 1a becomes an account server may further be provided.

(S24) On the other hand, the second apparatus that is the other display apparatus 1 of the home network 5 does not hold the account information. User authentication with a content distribution server 7 occurs in the second apparatus, for example, the display apparatus 1b. Namely, necessity of account information occurs for the user authentication.

(S25) An account information sharing unit 45 of the second apparatus transmits a reference request of the account information to the account server that is the first apparatus of the home network 5.

(S26) In a case where a reference request is received from the second apparatus, the account information sharing unit 45 of the first apparatus transmits, as a response, the account information, which has already been registered thereto at S23, to the second apparatus as a requestor.

(S27) The account information sharing unit 45 of the second apparatus does not register the account information received from the first apparatus to the second apparatus, but uses it in a process related to the user authentication of the user authenticating unit 44.

(S28) Further, then, when user authentication with the content distribution server 7 is carried out, the display apparatus 1a that is the account server can use the account information held therein to carry out a process related to the user authentication.

The above operation is similar even in a case where any of the plurality of display apparatuss 1 become the first apparatus and the second apparatus. Only one display apparatus 1a is set as the account server in the above example. However, it is not limited to this. Two or more display apparatuss 1 may become the account server. In that case, the second apparatus may access any of the account servers.

Moreover, only a specific display apparatus 1 of the plurality of display apparatuss 1 of the home network 5 may be set so as to become the account server. For example, by using a user setting function of the display apparatus 1, only the display apparatus 1a is set so as to become the account server. In that case, even though the mobile terminal 2 is first connected to any of apparatuses other than the display apparatus 1a, it is controlled so as not to become an account server on the basis of setting.

[Processing Flow]

FIG. 9 shows a processing flow at the time of initial setting in the display apparatus 1 according to the second embodiment. (A) of FIG. 9 shows a flow of first processing corresponding to the account server that is the first apparatus. (B) of FIG. 9 shows a flow of second processing corresponding to the second apparatus. There are Steps S141 to S145 in (A) of FIG. 9. Hereinafter, the processing flow will be described in the order of Steps.

(S141 to S143) Steps S141 to S143 are similar to Steps S101 to S103 in the first embodiment.

(S144, S145) At S144, the account information sharing unit 45 of the first apparatus that is the account server waits for a reference request of the account information from the second apparatus that is another display apparatus 1 of the home network 5. In a case where the account information sharing unit 45 receives a reference request (S144-Y), the processing flow proceeds to S145. At S145, the account information sharing unit 45 transmits, as a response to the reference request, the account information that the first apparatus has to the second apparatus.

There are Steps S151 to S155 in (B) of FIG. 9. Hereinafter, the processing flow will be described in the order of Steps.

(S151 to S153) At S151, in a case where user authentication by the user authenticating unit 44, that is, necessity of the account information occurs (S151-Y), the account information sharing unit 45 of the second apparatus causes the processing flow to proceed to S152. At S152, the account information sharing unit 45 confirms whether the account server that is the first apparatus is connected to the home network 5 or not. In a case where they are connected to each other (S152-Y), the processing flow proceeds to S152. At S153, the account information sharing unit 45 transmits a reference request of the account information to the account server that is the first apparatus.

(S154, S155) At S154, in a case where the account information sharing unit 45 receives the account information, which is transferred as the response, from the account server that is the first apparatus (S154), the processing flow proceeds to S155. At S155, the account information sharing unit 45 causes the user authenticating unit 44 to use the account information received at S154 for the user authentication, and terminates the processing flow without registering it in its own storage 26.

Effects and the Like

As described above, according to the second embodiment, it is possible to realize sharing of the account information of the home network 5 as well as the first embodiment. In the second embodiment, a step of referring to the first apparatus from the second apparatus becomes necessary at the time of the user authentication. However, there is an advantage that the account information may be held securely only in the first apparatus. Further, in a case where setting for releasing a sharing state is to be changed, deletion of the shared account information and the like may be carried out only in the first apparatus.

Third Embodiment

A display apparatus 1 and the like according to a third embodiment of the present invention will be described with reference to FIG. 10 to FIG. 12. A basic configuration according to the third embodiment is similar to that of the first embodiment. Hereinafter, component parts of the third embodiment different from those of the first embodiment will be described. In the third embodiment, a situation is assumed that may occur in a case where plural pieces of account information of a plurality of mobile terminals 2 are registered in the display apparatus 1 of a home network 5. In the third embodiment, the display apparatus 1 has, as a setting change, a function to delete account information registered to the display apparatus 1 in accordance with a situation.

[Content Viewing System]

Figure 10:
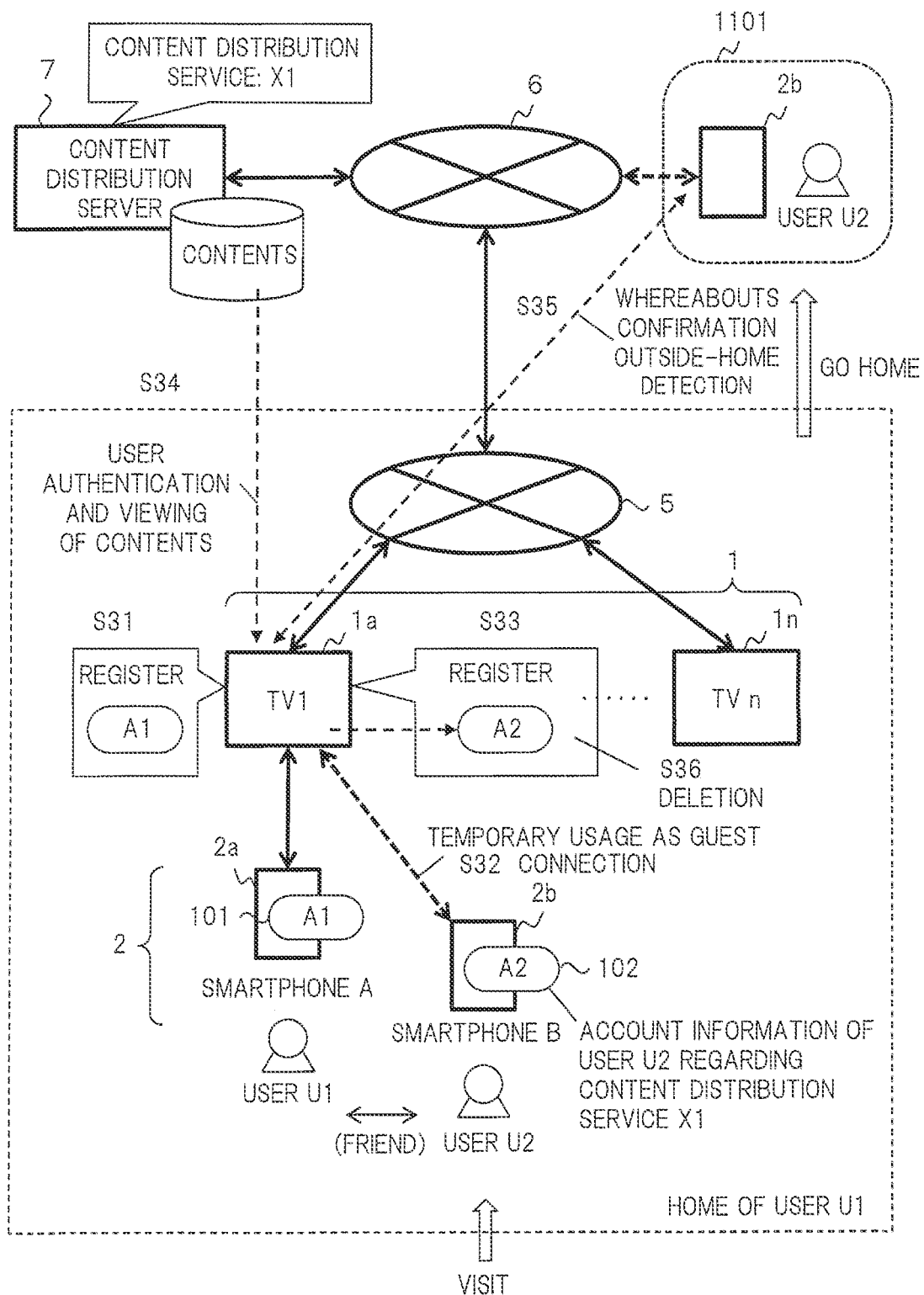
FIG. 10 is a view showing a system including a display apparatus and an example of an operating sequence at the time of initial setting according to a third embodiment of the present invention.

FIG. 10 shows an example of a content viewing system and an operating sequence according to the third embodiment. In FIG. 10, as a different point from FIG. 1, a user U2 who is a friend or the like of the user U1 is invited to home of the user U1. The user U1 possesses a "smartphone A" that is his or her own mobile terminal 2a, and the user U2 possesses a "smartphone B" that is his or her own mobile terminal 2b. The mobile terminal 2a of the user U1 has account information 101 regarding a content distribution service X1 as well as the first embodiment. Further, the mobile terminal 2b of the user U2 has account information 102 (which is indicated by "A2") regarding the content distribution service X1. The user U2 can normally use the content distribution service X1 in home or the like of the user U2 by using his or her own display apparatus, the mobile terminal 2b, and the account information 102.

In the example of FIG. 10, the user U2 who visits home of the user U1 temporarily uses the display apparatus 1 possessed by the user U1, and uses the content distribution service X1 by using the account information 102 of the mobile terminal 2b to view contents. The user U2 then goes home from the home of the user U1. The user U2 uses the same content distribution service X1 from the display apparatus of his or her home, for example. In the third embodiment, a function to control shared account information of the display apparatus 1 in home of the user U1 in such a situation is shown.

[Operating Sequence]

An example of an operating sequence according to the third embodiment will be described with reference to FIG. 10. There are Steps S31 to S36 in FIG. 10. Hereinafter, the operating sequence will be described in the order of Steps.

(S31) First, an operation in home of the user U1 is basically similar to the operation that has been explained in the first embodiment. Namely, the account information 101 that the mobile terminal 2a has is registered to the display apparatus 1a as the shared account information, for example.

(S32) The mobile terminal 2b of the user U2 who is a guest visiting home of the user U1 is connected to the display apparatus 1a, for example.

(S33) Account information sharing unit 45 of the display apparatus 1a that is the first apparatus obtains the account information 102 that the mobile terminal 2b has by means of transfer. The display apparatus 1a registers the account information 102 to the account information 504 of the user authentication information 503 in its own storage 26. The account information 504 becomes a state where two of the account information 101 of the user U1 and the account information 102 of the user U2 are contained.

In the present embodiment, as sharing of the account information, the account information 102 of the guest is held in only one display apparatus 1a. It is not limited to this. As well as the first embodiment and the like, the account information 102 of the guest can be held in the plurality of display apparatuss 1 of the home network 5 by means of the account sharing function. In that case, the account information sharing unit 45 carries out transfer of the account information among the display apparatuss 1 and the like as well as the first embodiment. This makes it possible for the user U2 to view contents via each of the display apparatuss 1. Further, the mobile terminal 2b of the guest can be connected to any of the display apparatuss 1 of the home network 5 to register the account information 102. Although it will be described later, user setting about whether the account information of the guest can be registered to the display apparatus 1 or not is possible.

(S34) It becomes a state where the account information 102 of the user U2 is registered to the display apparatus 1a. Therefore, the user U2 can view contents of the content distribution service X1 on the display apparatus 1a through the user authentication using the account information 102.

(S35) Then, the user U2 terminates to view the contents, and goes out from the home of the user U1 to his or her home, for example. A state 1101 shows a state where the mobile terminal 2*b* of the user U2 exists outside the home of the user U1, for example, in the home of the user U2. The user U2 uses the content distribution service X1 from the content distribution server 7 via the external network 6 through the display apparatus in the home and the mobile terminal 2*b*.

Thus, in a case where the mobile terminal 2*b* whose account information 102 is registered to the display apparatus 1*a* becomes a situation to first exist in the home of the user U1 and go to the outside of the home, the account information 102 of the user U2 exists at both the home of the user U1 and the outside of the home of the user U1. In the case of such a situation, in the conventional system, a request from the home of the user U1 and a request from the outside of the home of the user U1 may occur as requests for a content distribution server. In that case, in a case where the content distribution server does not permit to view contents at a different place depending upon a service design, for example, a result of the user authentication for one request is set to failure not to permit viewing. The third embodiment is a technique in which such a situation is supposed.

(S35) The account information sharing unit 45 of the display apparatus 1*a* that is the first apparatus, for example, regularly carries out whereabouts confirmation for the mobile terminal 2 to which the account information is registered, for example, the mobile terminal 2*b*. The account information sharing unit 45 carries out, as the whereabouts confirmation, detection and determination of whether the mobile terminal 2 of a registration source is in home associated with the home network 5 of the user U1 or not through the home network 5. This whereabouts confirmation is realized as follows, for example.

The display apparatus 1 may detect and determine whether the mobile terminal 2 is in or outside home by determining whether the mobile terminal 2 is connected to the home network 5 or not. This connection determination may be determined on the basis of presence or absence of wireless connection between the display apparatus 1 and the mobile terminal 2, or may be determined on the basis of presence or absence of connection between the display apparatus 1 and the mobile terminal 2 via the home network 5. Further, the display apparatus 1 may try wireless connection to the mobile terminal 2 on the basis of information when to first carry out wireless connection to the mobile terminal 2, and determine it on the basis of its result. Namely, in a case where the wireless connection to the mobile terminal 2 is possible or there is a response therefrom, the display apparatus 1 may determine that the mobile terminal 2 exists in the home. In a case where the wireless connection is impossible or there is no response therefrom, the display apparatus 1 may determine that the mobile terminal 2 exists outside the home. In a case where wireless connection to the mobile terminal 2 is first established and the wireless connection is then cut or a predetermined time elapses after cutting the wireless connection, the display apparatus 1 may determine that the mobile terminal 2 exists outside the home.

The whereabouts confirmation may be realized by using short-range wireless communication between an apparatus constituting the display apparatus 1 or the home network 5 and the mobile terminal 2. The whereabouts confirmation may use a method to use a beacon emitted by the mobile terminal 2 or the like and detect the beacon or the like by the display apparatus 1. Namely, the display apparatus 1 may determine that the mobile terminal 2 exists outside the home in a case where the mobile terminal 2 goes out from within a predetermined radius distance range associated with the home.

At S35, the display apparatus 1*a* detects that a specific mobile terminal 2*b* whose account information is registered of a plurality of mobile terminals 2 that exists in the home of the user U1 does not exist in the home, that is, exists outside the home.

(S36) The account information sharing unit 45 of the display apparatus 1*a* deletes the account information 102 of the mobile terminal 2*b*, which is registered and held thereto on the basis of detection of outside home at S35. Herewith, a setting state of the display apparatus 1*a* is updated to be invalidated so that the account information 102 cannot be used for the user authentication. This causes the user U2 to be set so that the user U2 cannot continue to use viewing of contents via the display apparatus 1 in the home of the user U1.

[Processing Flow]

Figure 11:
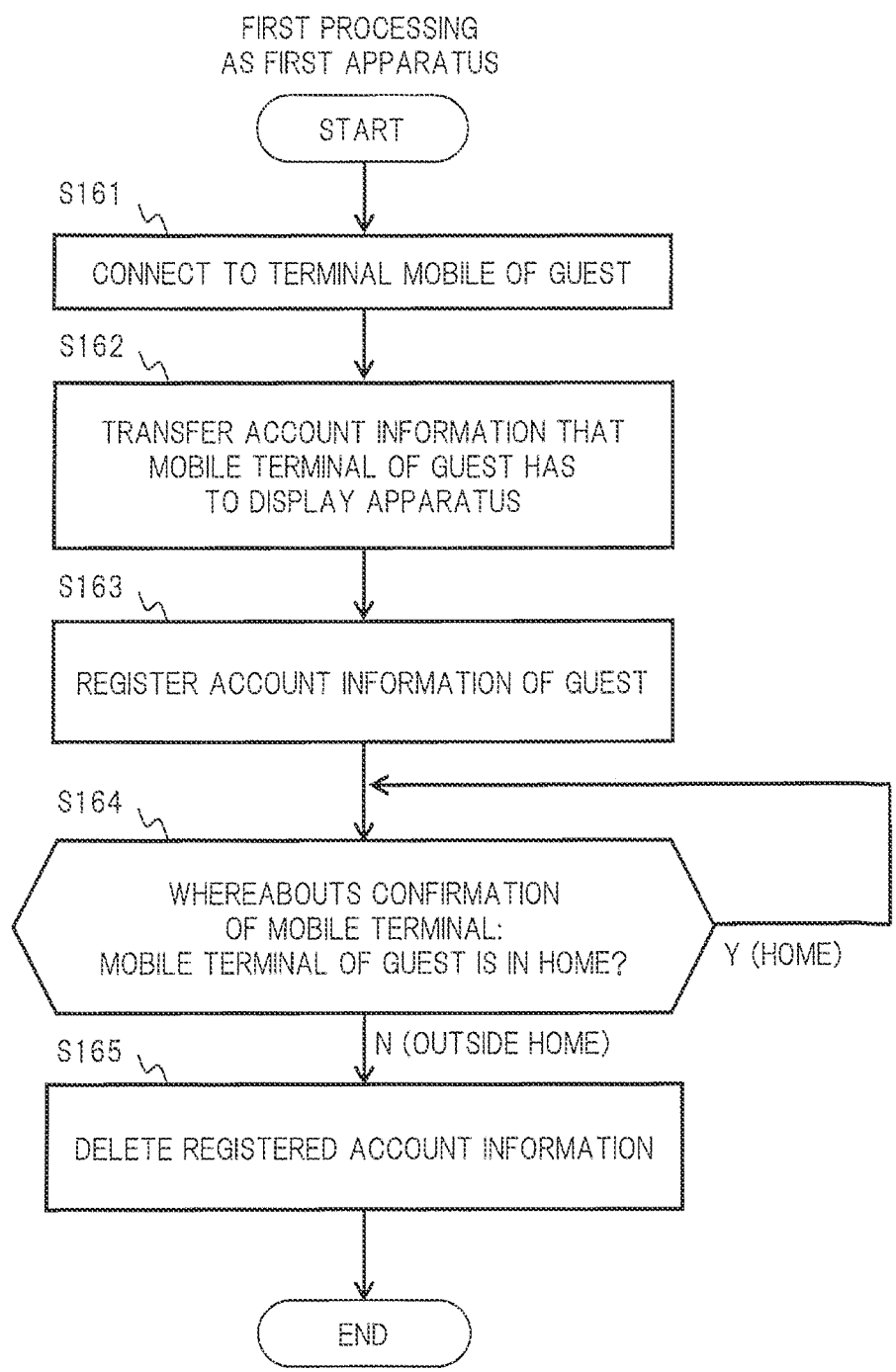
FIG. 11 is a view showing a processing flow of the display apparatus according to the third embodiment.

FIG. 11 shows a processing flow as the first apparatus of the display apparatus 1 according to the third embodiment. There are Steps S161 to S165 in FIG. 11. Hereinafter, the processing flow will be described in the order of Steps.

(S161 to S163) At S161, the first apparatus is connected to the mobile terminal 2 of a guest, for example, the mobile terminal 2*b* of the user U2. At S162, the account information sharing unit 45 of the first apparatus obtains account information of the mobile terminal 2 of the guest by means of transfer. At S163, the account information sharing unit 45 registers the account information of the guest to the account information 504 of the user authentication information 503 in its own storage 26.

(S164, S165) At S164, the account information sharing unit 45 regularly carries out whereabouts confirmation of the mobile terminal 2 of the guest, which is a registration source of the account information at S163. In a case where the account information sharing unit 45 detects and determines that the mobile terminal 2 of the guest does not exist in the home, that is, exists outside the home (S164-N), the processing flow proceeds to S165. At S165, the account information sharing unit 45 deletes the account information of the mobile terminal 2 of the guest, which is registered to the account information 504 of the user authentication information 503 in its own storage 26.

Effects and the Like

As described above, according to the third embodiment, even in a case where a person such as a friend who comes to the home of the user temporarily uses the display apparatus 1 of the home network 5 to view contents, it is possible to carry out its setting easily. Further, in that case, the account information of the guest, which is registered to the display apparatus 1 in the home is deleted in a case where the mobile terminal 2 of the guest goes out from the home. Herewith, there is no worry that the account information is kept being used. The user as the guest is prevented from using the display apparatus 1 from the outside to view contents and the like.

First Modification Example

The following is possible as a first modification example of the third embodiment. In this first modification example, whereabouts confirmation and account information deletion for a mobile terminal 2 are carried out in accordance with a result of user authentication.

Figure 12:
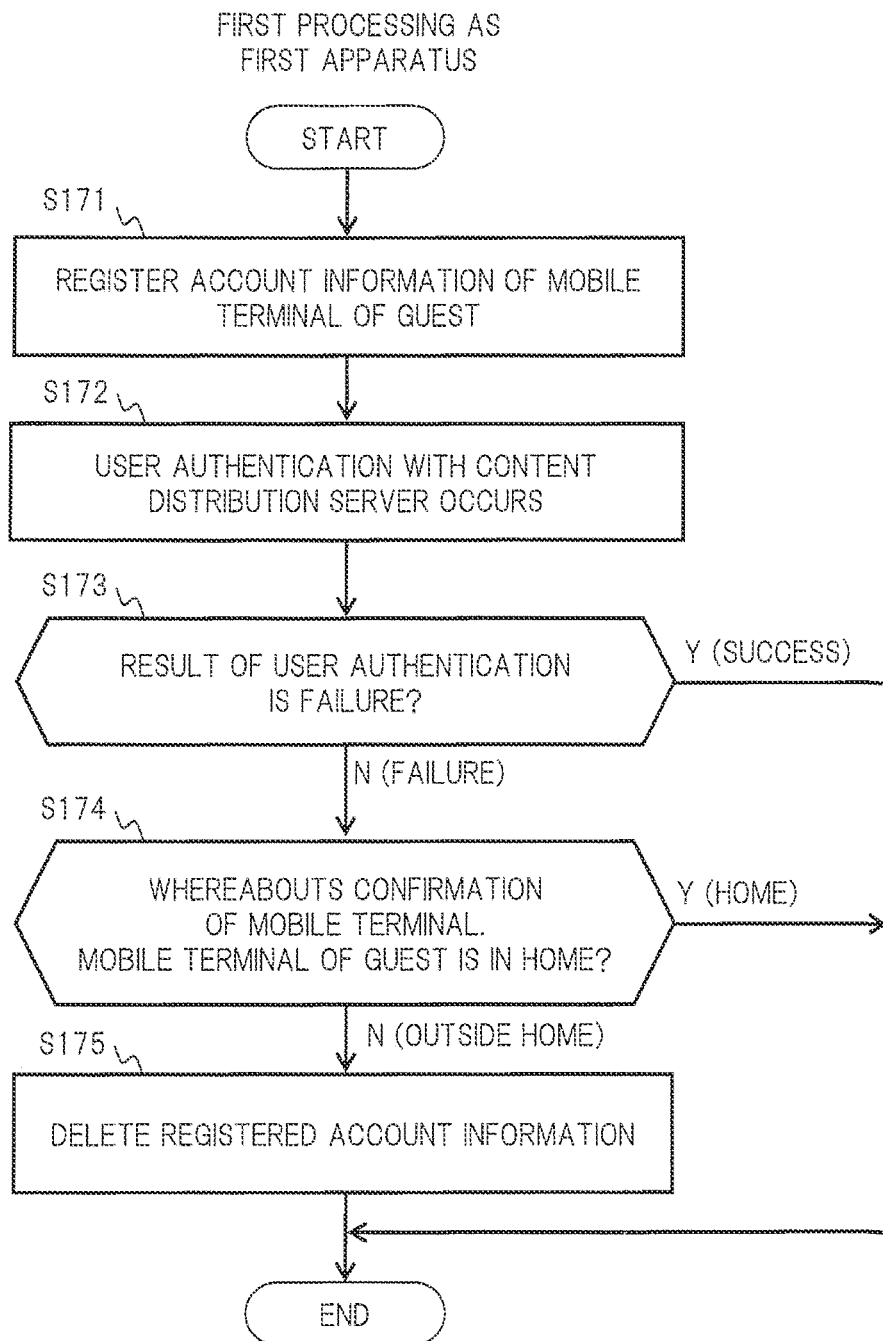
FIG. 12 is a view showing a processing flow of the display apparatus according to a first modification example of the third embodiment.

FIG. 12 shows a processing flow as a first apparatus of a display apparatus 1 according to the first modification example of the third embodiment. There are Steps S171 to S176 in FIG. 12. Hereinafter, the processing flow will be described in the order of Steps.

(S171) As well as the third embodiment, account information of the mobile terminal 2 of a guest is registered in the display apparatus 1.

(S172, S173) At S172, user authentication with a content distribution server 7 occurs. The display apparatus 1 transmits a content reproducing request and the like to the content distribution server 7 on the basis of an operation of the user as the guest in accordance with a normal content view operating sequence. At that time, the user authenticating unit 44 transmits user authentication information containing the account information to the content distribution server 7 by using the account information of the guest that has already been registered thereto. The user authenticating unit 44 receives a result of user authentication from the content distribution server 7. At S173, in a case where in the display apparatus 1 the result of the user authentication is failure (S173-Y), the processing flow proceeds to S174.

(S174, S175) At S174, the account information sharing unit 45 of the display apparatus 1 carries out the whereabouts confirmation of the mobile terminal 2 of the guest, which is a registration source of the account information. In a case where the mobile terminal 2 of the guest is in home (S174-Y), the processing flow is terminated because there is no problem. In a case where it is not in home (S174-N), the processing flow proceeds to S175. At S175, the account information sharing unit 45 works together with the user authenticating unit 44 to delete the account information of the mobile terminal 2 of the guest, which is registered thereto.

In this regard, in a case where the account information is held in a plurality of display apparatuss 1 of a home network 5 when to delete the account information, the first apparatus similarly deletes plural pieces of account information held in the plurality of display apparatuss 1. In this case, for example, the first apparatus transmits an instruction to delete the account information to a second apparatus that is another display apparatus 1 of the home network 5. The second apparatus that receives the instruction deletes the corresponding account information that has been registered thereto.

In the first modification example of the third embodiment, in a case where the result of the user authentication becomes failure in a situation that there is the account information in and outside the home of the user U1 as described above, the account information is deleted. This makes it possible to obtain the similar effects to those of the third embodiment. In this regard, it may be a form in which the step of the whereabouts confirmation at S174 is omitted and the account information is immediately deleted in a case where the result of the user authentication is failure.

Fourth Embodiment

A display apparatus 1 and the like according to a fourth embodiment of the present invention will be described with reference to FIG. 13 to FIG. 16. A basic configuration according to the fourth embodiment is similar to that according to the first embodiment. Hereinafter, component parts of the fourth embodiment different from those of the first embodiment will be described. In the fourth embodiment, with respect to an account sharing function, a plurality of display apparatuss 1 of the home network 5 does not have the same operation and the same setting, but may have a different operation and different setting for each of the display apparatuss 1. In the fourth embodiment, the account sharing function is restricted for each of the display apparatuss 1. In the fourth embodiment, whether the account sharing function is to be used or not, that is, whether the account information is to be shared or not and the like can be set for each of the display apparatuss 1.

In the display apparatus 1 according to the fourth embodiment, a user setting function of allowing setting regarding the account sharing function as user setting is provided. This user setting function is realized by using a user setting unit 46 of FIG. 4. The user setting unit 46 works together with the account information sharing unit 45. A state of the user setting is managed by using setting information 505. The account information sharing unit 45 controls, on the basis of the setting information 505 of the user setting unit 46, whether account information is shared or not for each of the display apparatuss 1.

In the display apparatus 1 according to the fourth embodiment, an account registering screen is provided at the time of initial setting of account information regarding the account sharing function, and an account registering process is carried out. A first apparatus registers the account information through the account registering screen.

In the display apparatus 1 according to the fourth embodiment, a setting screen is displayed on the display apparatus 1 by using the user setting function. A user can set the account sharing function regarding the plurality of display apparatuss 1 of the home network 5 while watching the setting screen.

A method to be used can be selected from various kinds of methods shown in the first to third embodiments described above in accordance with setting using the user setting function. For example, setting in which a specific display apparatus 1 can become the first apparatus, but another specific display apparatus 1 cannot become the first apparatus is possible like the first embodiment. Further, setting in which a specific display apparatus 1 can become an account server, but the other display apparatuss 1 cannot become the account server is possible like the second embodiment. Further, setting in which a specific display apparatus 1 can become the first apparatus that is allowed to register account information of a guest is possible like the third embodiment.

In the fourth embodiment, the following is also possible as setting regarding the account sharing function. In a case where one mobile terminal 2 has plural pieces of account information, setting to select so that all of the plural pieces of account information is not registered to the display apparatus 1, but part of the plural pieces of account information is registered is possible. Further, in a case where a plurality of mobile terminals 2 each having account information exists, setting to select so that the account information of all of the plurality of the mobile terminal 2 is not registered to the display apparatus 1, but the account information of a part of the mobile terminals 2 is registered is possible. Further, setting in which specific content of a group of contents in a content distribution service associated with the account information can be viewed, and another specific content cannot be viewed is possible.

Setting regarding sharing of account information is possible for every account information and each mobile terminal 2. For example, a first mobile terminal has first and second account information. By user setting, the first account information can be shared with all of the display apparatuss of the home network 5, and the second account information can be held in only a specific display apparatus 1.

The user setting unit 46 displays the setting screen on a display unit 20. The user can carry out the user setting by means of an input operation through input means 23 to the display apparatus 1 while viewing the setting screen. Further, as described above, the user may operate the display apparatus 1 from the mobile terminal 2, whereby the user setting is similarly possible. In that case, the user setting unit 46 may display the setting screen on a screen of the mobile terminal 2.

The following is possible with respect to timing to carry out the user setting by using the user setting function. At arbitrary timing, the user can basically invoke and use the setting screen by the user setting function in response to an operation for the display apparatus 1 or the mobile terminal 2. For example, the user setting is in advance possible before the initial setting. Further, the user setting is also possible after the initial setting. The account registering screen is displayed at the time of the initial setting, and at that time, it can transit to the setting screen.

[Content Viewing System]

Figure 13:
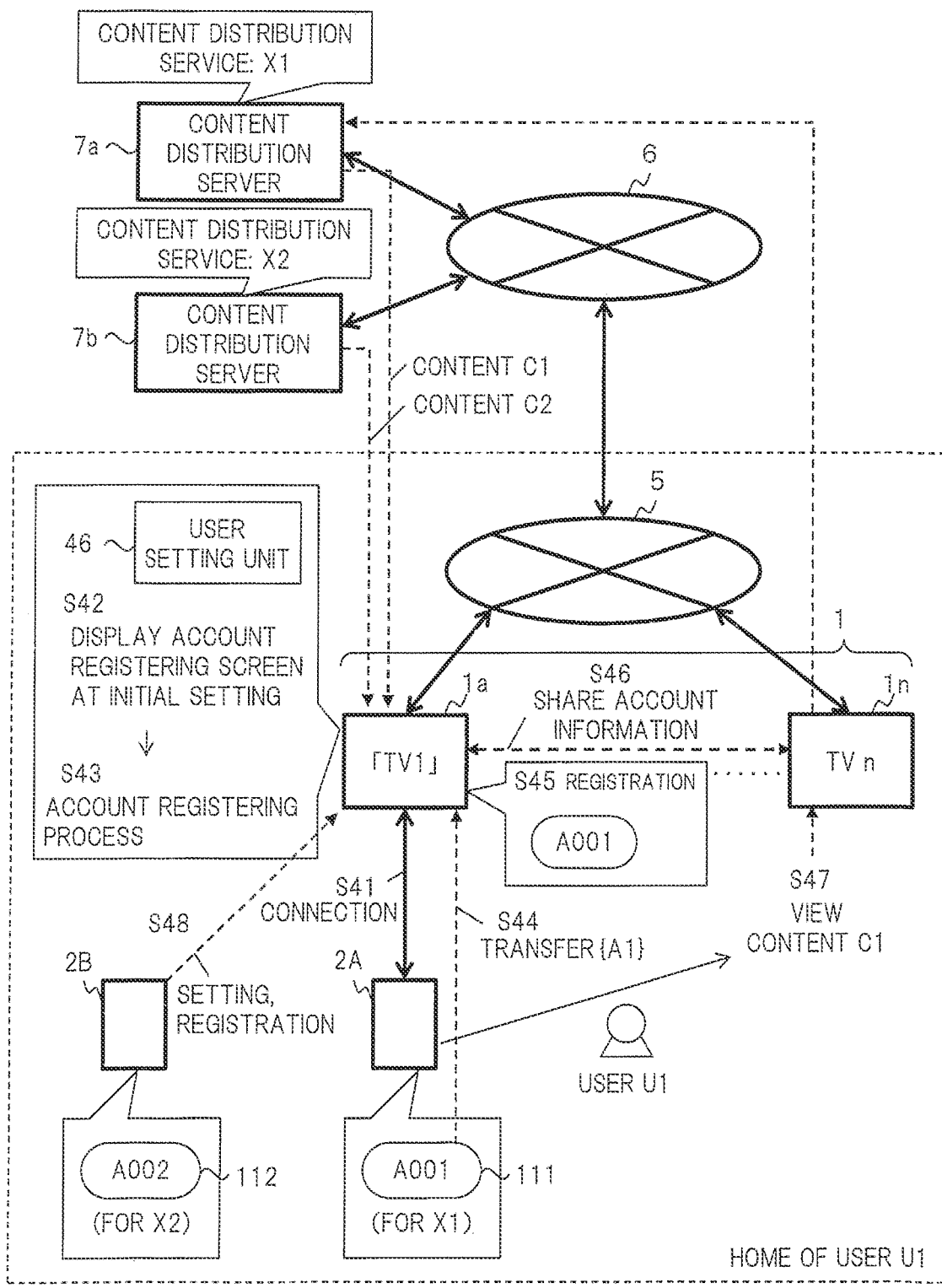
FIG. 13 is a view showing a system including a display apparatus and an example of an operating sequence at the time of initial setting according to a fourth embodiment of the present invention.

FIG. 13 shows a content viewing system and an example of an operating sequence according to the fourth embodiment. In FIG. 13, as a different point from FIG. 1, a mobile terminal 2A of a user U1 has account information 111 (which is indicated by "A001") and another mobile terminal 2B has another account information 112 (which is indicated by "A002"). The account information 111 is one for a content distribution service X1 of a content distribution server 7*a*, and the account information 112 is one for a content distribution service X2 of a content distribution server 7*b*.

A display apparatus 1*a* displays the account registering screen at the time of the initial setting by means of the user setting unit 46, and displays the setting screen at arbitrary timing.

[Operating Sequence]

An example of an operating sequence at the time of initial setting according to the fourth embodiment will be described with reference to FIG. 13. In the present embodiment, the account information 111 that the mobile terminal 2A has is registered to the display apparatus 1*a*, and it is shared with all of the display apparatuss 1 of the home network 5. The account information 112 that the mobile terminal 2B has is registered to only a specific display apparatus 1 on the basis of user setting. There are Steps S41 to S48 in FIG. 13. Hereinafter, the operating sequence will be described in the order of Steps.

(S41) Registration of the account information 111 will first be described. For example, the mobile terminal 2A is connected to the display apparatus 1*a*.

(S42) The user setting unit 46 of the display apparatus 1*a* that is the first apparatus displays an account registering screen (FIG. 14, will be described later) on a screen of the display unit 20 of the display apparatus 1*a* at the time of the initial setting. The user watches the account registering screen to confirm whether the account information 111 that the mobile terminal 2A has is to be registered as shared account information of all of the display apparatuss 1 including the display apparatus 1*a* or not. In a case where it is to be registered, the user carries out an input to register it.

(S43) The user setting unit 46 carries out an account registering process through the account registering screen at S42 on the basis of a user confirming input to register the account information 111 into the display apparatus 1*a*. Specifically, this process includes S44 to S46.

(S44 to S46) At S44, the account information sharing unit 45 obtains the account information 111 from the mobile terminal 2 by means of transfer. At S45, the account information sharing unit 45 registers, as the shared account information, the account information 111 to the account information 504 of the user authentication information 503 in the storage 26. At S46, the account information sharing unit 45 carries out transfer and the like so as to become a state where the account information 111 is shared among the plurality of display apparatuss 1 of the home network 5 in the similar manner to those of the first embodiment and the like. For example, the account information sharing unit 45 of the display apparatus 1*n* registers the account information 111 transferred from the display apparatus 1*a* to its own display apparatus 1*n*.

(S47) Then, for example, the user can connect the mobile terminal 2A to the display apparatus 1*n* to use the content distribution service X1 through the display apparatus 1*n* and the like. At this time, since the account information 111 has already been registered to the display apparatus 1*n* as the shared account information, the display apparatus in does not output the account registering screen. The display apparatus 1*n* carries out a request for contents C1 to the content distribution server 7*a* on the basis of a user operation, for example. The display apparatus 1*n* creates the user authentication information by using the account information 111 held therein when to carry out the user authentication, and transmits it to the content distribution server 7*a*. This makes it possible for the user to view the contents C1 on the display apparatus 1*n* from the content distribution server 7*a* without labor for registering account information.

(S48) Registration of the account information 112 that the mobile terminal 2B has is as follows. The user U1 invokes a user setting function by an input operation to any of the display apparatuss 1, for example, the display apparatus 1*a*. At this time, the user U1 may connect the mobile terminal 2B to the display apparatus 1*a* to carry out the input operation. The user setting unit 46 displays a setting screen (FIG. 15, will be described later) on the display apparatus 1*a*. In the setting screen, there is a setting item of whether account information for each display apparatus 1 is shared or not with respect to the plurality of display apparatuss 1 of the home network 5. In a case where the user U1 wants to register the account information 112 to only the display apparatus 1*a*, for example, the user U1 selects and sets that it is to be registered to only the display apparatus 1*a* on the setting screen. The user setting unit 46 stores a setting state thereof in the setting information 505. Subsequently, in a case where the user U1 finishes registering the account information 112, the user U1 connects the mobile terminal 2B to the display apparatus 1*a*, for example. The account information sharing unit 45 of the display apparatus 1*a* registers the account information 112 into its own storage 26 on the basis of the setting information 505, but does not register it to the other display apparatuss 1.

[Account Registering Screen]

Figure 14:
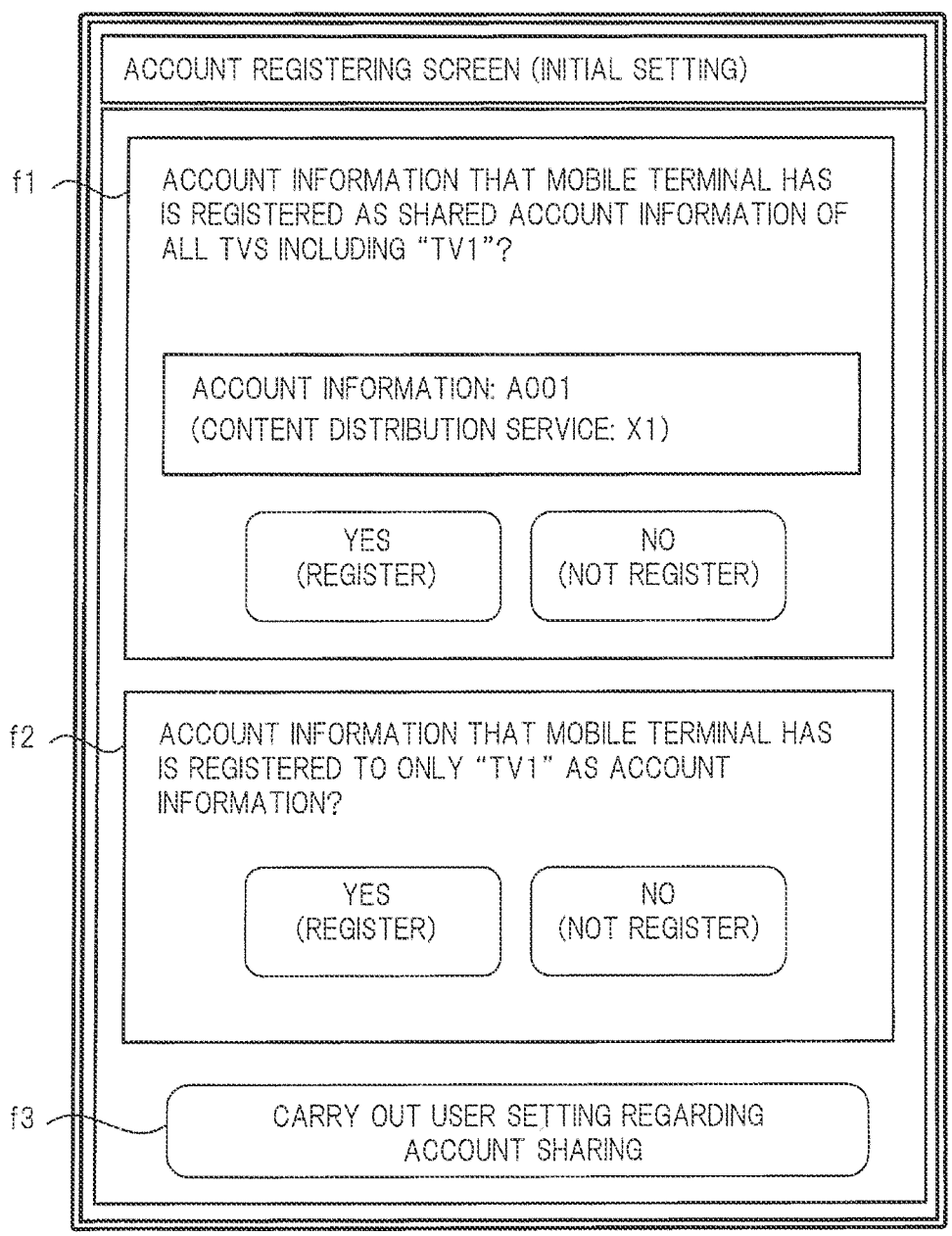
FIG. 14 is a view showing an example of an account registering screen according to the fourth embodiment.

FIG. 14 shows an example of an account registering screen that is outputted by the display apparatus 1 to which the mobile terminal is connected at the time of initial setting. This account registering screen includes an item f1, an item f2, and an item f3.

A message of registration confirmation and the like are displayed in the item f1. In the present embodiment, "Account information that a mobile terminal has is registered as shared account information of all TVs including 'TV1'?" is displayed in the item f1. Further, the content of the account information is displayed in the item f1 for confirmation. Further, "Yes" and "No" buttons corresponding to whether to register it or not are displayed in the item f1. The user can select whether to register it or not through the item f1. In a case where "register (Yes)" is selected, it corresponds to setting in which the account sharing function is used in all of the display apparatuss 1 of the home network 5. Then, the operating sequence that has been described in the first embodiment and the like is carried out automatically.

Further, in a case where "not register (No)" is selected in the item f1, the item f2 may be displayed. As well as conventional one, the item f2 is an item corresponding to the case where the account information is registered to only one display apparatus 1. In the present embodiment, "Account information that a mobile terminal has is registered to only 'TV1' as account information?" is displayed in the item f2. In a case where "register (Yes)" is selected, the account sharing function is not applied thereto, and the account information is not registered to the other display apparatuss 1 of the home network 5.

Further, a button that allows user setting regarding the account sharing function is displayed in the item f3. In a case where this item f3 is selected, it transits to a setting screen as shown in FIG. 15.

[Setting Screen]

FIG. 15 shows an example of the setting screen that is displayed by the user setting function of the user setting unit 46. This setting screen includes items g1 to g5. In the present embodiment, a display example at the time of initial setting is shown.

The item g1 is an item to set whether the account sharing function regarding the plurality of display apparatuss 1 of the home network 5 is to be used or not. The user can select whether to use it or not. In a case where "use" is selected in this item g1, the account sharing function, which has been explained in the first embodiment and the like, is applied with an effective state, and details can be set in the item g2 and the following. In a case where "not use" is selected in this item g1, it is not applied, and becomes an operation similar to the conventional one.

The item g2 is a setting item regarding whether separate setting is carried out for each apparatus or not. The user can select whether to carry out the separate setting or not. In a case where it is set to carry out the separate setting in this item g2, the content thereof can be set in the item g4.

The item g3 is a setting item of application propriety of the account sharing function regarding the mobile terminal 2 of the guest like the third embodiment. In a case where it is set to carry out sharing in this item g3, the content thereof can similarly be set in another item (not shown in the drawings).

The item g4 is an item of the separate setting for each apparatus. In the present embodiment, a table for the setting is displayed in the item g4. The user setting unit 46 displays a table having the content corresponding a current setting state on the basis of the setting information 505. In this table, a name of the display apparatus 1 that is the apparatus, an apparatus ID, an account sharing propriety, and a content propriety are provided as items. The "account sharing propriety" item can set whether the account sharing function is to be applied or not for each of the display apparatuss 1 indicated by the apparatus IDs. The user can set a propriety of each of the display apparatuss 1 through the "account sharing propriety" item by an operation of a check button, for example. The display apparatus 1 set to "available" in this item carries out an operation by the account sharing function. The display apparatus 1 set to "unavailable" in this item does not carry out the operation by the account sharing function. For example, the display apparatus 1n indicated by "TVn" in a fourth row is set to "unavailable", does not become any of the first apparatus and the second apparatus described above, and the account information is not held.

The item g4 is a display example at the time of the initial setting before registering the account information, and an item of individual account information and an item of information regarding the mobile terminal 2 are not displayed therein. An item allowing separate setting for each piece of account information and an item allowing separate setting for each of the mobile terminals 2 can be realized similarly.

Further, the "content propriety" item is a setting item regarding viewing propriety for each of contents in the display apparatus 1 indicated by the apparatus ID. The content of "content propriety" item can be set in the item g5. The item g5 is a setting item of propriety for each of contents. An ID of a content distribution service associated with the account information can be selected in the item g5. A list of the contents for every account information and every content distribution service is displayed in the item g5. The display apparatus 1 obtains content list information on the basis of communication with the content distribution server 7. In the present embodiment, a list of contents corresponding to certain account information is displayed in the item g5 as a table. It is not limited to this, but may be a form in which icons for respective contents are arranged therein, or the like. Items of explanatory information (not shown in the drawings), viewing propriety and the like are provided for each of the contents in the list. The user can set propriety for each of the contents in the "viewing propriety" item, for example, by an operation of the check button. In this regard, it may be a form in which all of the contents are basically shared and the user is caused to select non-sharing content, or a form in which all of the contents is basically not shared and the user is caused to select sharing content.

[Setting Information]

FIG. 16 shows a configuration example of a table of the setting information 505 that is managed by the user setting unit 46. The table of FIG. 16 includes, as columns, account information, a mobile terminal apparatus ID, a display apparatus apparatus ID, a sharing propriety, and a content propriety. A first column "account information" indicates account information that the mobile terminal 2 has. The "mobile terminal apparatus ID" in a second column indicates an apparatus ID of the mobile terminal 2. A third column "display apparatus apparatus ID" indicates an apparatus ID of the display apparatus 1, for example, a MAC address. A fourth column "sharing propriety" is a flag that indicates the account information in the first column is held in the display apparatus 1 in the third column and is shared or not. A fifth column "content propriety" indicates a setting value regarding the viewing propriety for each of contents. For example, "ALL" indicates a setting value to allow the user to view all contents of a content distribution service associated with account information. Further, an individual content ID can be described in this column, and contents that the user is allowed to view and contents that the user is not allowed to view can be set.

First to third rows indicate setting for account information "A001" to be shared with three display apparatuss 1 by using the account sharing function. Fourth to sixth rows indicate setting for account information "A002" to be registered to only the display apparatus 1a of the three display apparatuss 1. Account information "B001" is held in the display apparatus 1a, but indicates setting in which the user is allowed to view only specific content "C00003".

Effects and the Like

As described above, according to the fourth embodiment, the user setting function regarding the account sharing function and the like are provided. This makes it possible for the user to easily carry out account registration and user setting while watching the screen. A setting operation can directly be carried out by the display apparatus 1 alone, or can be carried out from the mobile terminal 2. The user can carry out, by using the user setting function, all the settings regarding the account sharing function for the plurality of display apparatuss 1 of the home network 5 on the screen of the display apparatus 1 or the mobile terminal 2 in an easily understood manner. For that reason, it is possible to make labor of the user smaller and to prevent a setting error compared with the case where account information is separately set to a plurality of apparatuses like prior art.

As described above, the present invention has been described specifically on the basis of the embodiments. However, the present invention is not limited to the embodiments, and the present invention may be modified into various forms without departing from the substance thereof. A combination of the plurality of embodiments described above, and replacement, addition or deletion of any constituent element are also possible. Each of the constituent elements and means can be realized by software program processing, a hardware circuit or the like. Various kinds of data, information, and programs in the apparatus may be a form to use those stored in an external storage medium or a form to use those stored in an apparatus on an external network.

REFERENCE SINGS LIST 1, 1a, 1b, 1n . . . display apparatus, 2 . . . mobile terminal, 5 . . . home network, 6 . . . external network, 7 . . . content distribution server, 8 . . . broadcast station, 42 . . . content reproducing unit, 44 . . . user authenticating unit, 45 . . . account information sharing unit, 46 . . . user setting unit, 101 . . . account information.

What is claimed is:

1. A display apparatus configured to be connected to a home network of a first user, the display apparatus comprising:
  a communication interface configured to communicate with a server on an external network via the home network;
  a display configured to display a content received from the server via the home network;
  a memory configured to store software programs; and
  a processor configured to carry out the software programs, the software programs including:
    a content reproducing program to receive a content from the server and to reproduce the content so as to be displayed;
    an authenticating program to carry out a process related to authentication for viewing the content by using account information associated with a content distribution service, the content being to be distributed in the content distribution service; and
    an account information sharing program to communicate with a mobile terminal of a second user for obtaining account information that the mobile terminal has and to register the account information as account information that is shared by a plurality of display apparatuses connected to the home network,
  wherein, in a case where the account information is registered, the account information sharing program carries out connection confirmation of the mobile terminal to the home network,
  wherein, in a case where it is detected that the mobile terminal is not connected to the home network, the registered account information is invalidated, and
  wherein the account information is associated with biometrics authentication information of the second user of the mobile terminal.

* * * * *